United States Patent
Poffet et al.

(10) Patent No.: US 10,843,932 B2
(45) Date of Patent: Nov. 24, 2020

(54) SURFACE-COATED CALCIUM CARBONATE-CONTAINING MATERIAL AND PROCESS FOR THE PURIFICATION OF WATER

(71) Applicant: Omya International AG, Oftringen (CH)

(72) Inventors: Martine Poffet, Olten (CH); Pascal Jäggi, Trimbach (CH); Daniel E. Gerard, Basel (CH); Peter Hess, Neuwied (DE)

(73) Assignee: Omya International AG, Oftringen (CH)

( * ) Notice: Subject to any disclaimer, the term of this patent is extended or adjusted under 35 U.S.C. 154(b) by 83 days.

(21) Appl. No.: 15/553,263

(22) PCT Filed: Mar. 3, 2016

(86) PCT No.: PCT/EP2016/054601
§ 371 (c)(1),
(2) Date: Aug. 24, 2017

(87) PCT Pub. No.: WO2016/146404
PCT Pub. Date: Sep. 22, 2016

(65) Prior Publication Data
US 2018/0093899 A1    Apr. 5, 2018

Related U.S. Application Data

(60) Provisional application No. 62/136,696, filed on Mar. 23, 2015.

(30) Foreign Application Priority Data

Mar. 16, 2015 (EP) .................................... 15159304

(51) Int. Cl.
| | | |
|---|---|---|
| B32B 5/16 | (2006.01) | |
| C01F 11/18 | (2006.01) | |
| C02F 1/28 | (2006.01) | |
| C02F 11/14 | (2019.01) | |
| C02F 1/52 | (2006.01) | |
| B01J 20/32 | (2006.01) | |
| B01J 20/26 | (2006.01) | |
| B01J 20/04 | (2006.01) | |
| B01J 20/24 | (2006.01) | |

(Continued)

(52) U.S. Cl.
CPC ........... *C01F 11/185* (2013.01); *B01J 20/043* (2013.01); *B01J 20/24* (2013.01); *B01J 20/261* (2013.01); *B01J 20/262* (2013.01); *B01J 20/264* (2013.01); *B01J 20/28004* (2013.01); *B01J 20/28057* (2013.01); *B01J 20/3085* (2013.01); *B01J 20/3204* (2013.01); *B01J 20/327* (2013.01); *B01J 20/3272* (2013.01); *B01J 20/3274* (2013.01); *B01J 20/3276* (2013.01); *C02F 1/288* (2013.01); *C02F 1/5236* (2013.01); *C02F 11/14* (2013.01); *C08L 31/06* (2013.01); *C01P 2002/60* (2013.01); *C01P 2004/61* (2013.01); *C01P 2004/62* (2013.01); *C01P 2006/40* (2013.01); *C02F 1/5263* (2013.01); *C02F 1/56* (2013.01); *C02F 2101/10* (2013.01); *C02F 2103/007* (2013.01); *C02F 2103/08* (2013.01); *C02F 2103/10* (2013.01); *C02F 2103/14* (2013.01); *C02F 2103/22* (2013.01); *C02F 2103/28* (2013.01); *C02F 2103/365* (2013.01)

(58) Field of Classification Search
CPC ........ C02F 1/281; C02F 1/283; C02F 1/5236; C02F 1/5245; C02F 1/54; C02F 1/56; B01J 20/043; B01J 20/28004; B01J 20/28057; Y10T 428/2991; Y10T 428/2998
USPC .................................................. 428/403, 407
See application file for complete search history.

(56) References Cited

U.S. PATENT DOCUMENTS

| | | | |
|---|---|---|---|
| 4,631,132 A | 12/1986 | Jones | |
| 2004/0137349 A1* | 7/2004 | Horikoshi | G03G 9/09 430/108.6 |

(Continued)

FOREIGN PATENT DOCUMENTS

| | | |
|---|---|---|
| EP | 1982759 A1 | 3/2007 |
| EP | 2011766 A1 | 1/2009 |

(Continued)

OTHER PUBLICATIONS

Amjad and Zuhl, The Influence of Water System Impurities on the Performance of Deposit Control Polymers as Particulate Dispersants, Association of Water Technologies, Oct. 2001 (Year: 2001).*

(Continued)

*Primary Examiner* — Hoa (Holly) Le
(74) *Attorney, Agent, or Firm* — Fay Sharpe LLP

(57) ABSTRACT

The present invention relates to at least one surface-reacted calcium carbonate-comprising mineral material and/or a surface-reacted precipitated calcium carbonate that is/are coated with at least one anionic polymer to obtain a surface-coated calcium carbonate-comprising material as well as to a process for the preparation of the surface-coated calcium carbonate-comprising material. Furthermore, the present invention relates to a process for the purification of water and/or dewatering of sludges and/or suspended sediments and to the use of a surface-coated calcium carbonate-comprising material for water purification and/or dewatering of sludges and/or suspended sediments.

23 Claims, No Drawings

(51) Int. Cl.
  *B01J 20/28*   (2006.01)
  *B01J 20/30*   (2006.01)
  *C08L 31/06*   (2006.01)
  *C02F 103/00*   (2006.01)
  *C02F 103/08*   (2006.01)
  *C02F 103/10*   (2006.01)
  *C02F 103/28*   (2006.01)
  *C02F 1/56*   (2006.01)
  *C02F 101/10*   (2006.01)
  *C02F 103/14*   (2006.01)
  *C02F 103/22*   (2006.01)
  *C02F 103/36*   (2006.01)

(56) References Cited

U.S. PATENT DOCUMENTS

| | | |
|---|---|---|
| 2006/0162884 A1 | 7/2006 | Gane et al. |
| 2009/0270543 A1 | 10/2009 | Mongoin et al. |
| 2010/0086987 A1* | 4/2010 | Gane ............... B01J 20/043 435/243 |
| 2012/0186492 A1 | 7/2012 | Gane et al. |
| 2014/0209544 A1 | 7/2014 | Poffet et al. |
| 2014/0299823 A1* | 10/2014 | Gane ............... C02F 1/5245 252/519.32 |
| 2015/0166792 A1 | 6/2015 | Gene et al. |
| 2015/0225568 A1 | 8/2015 | Gane et al. |
| 2015/0274565 A1 | 10/2015 | Kummer et al. |
| 2015/0322604 A1 | 11/2015 | Brunner et al. |
| 2016/0060143 A1 | 3/2016 | Gerard et al. |

FOREIGN PATENT DOCUMENTS

| | | |
|---|---|---|
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2589430 A1 | 5/2013 |
| EP | 2749679 A1 | 7/2014 |
| EP | 2801555 A1 | 11/2014 |
| WO | 2010037753 A1 | 4/2010 |
| WO | 2013064492 A1 | 5/2013 |
| WO | 2013142473 A1 | 9/2013 |
| WO | 2014064073 A1 | 5/2014 |
| WO | 2014180631 A1 | 11/2014 |

OTHER PUBLICATIONS

Tripathy & De, Flocculation: A New Way to Treat the Waste Water, Journal of Physical Sciences, vol. 10, 2006, 93-127 (Year: 2006).*
Tripathy and Ranjan De, Flocculation : A New Way to Treat the Waste Water, Journal of Physical Sciences, vol. 10, 2006, (Year: 2006) 93-127.*
International Search Report dated May 12, 2016 for PCT Application No. PCT/EP2016/054601.
Written Opinion of International Searching Authority May 12, 2016 for PCT Application No. PCT/EP2016/054601.

* cited by examiner

SURFACE-COATED CALCIUM CARBONATE-CONTAINING MATERIAL AND PROCESS FOR THE PURIFICATION OF WATER

CROSS-REFERENCE TO RELATED APPLICATIONS

This is a U.S. national phase of PCT Application No. PCT/EP2016/054601, filed Mar. 3, 2016, which claims priority to European Application No. 15159304.3, filed Mar. 16, 2015 and U.S. Provisional Application No. 62/136,696, filed Mar. 23, 2015.

The present invention relates to a surface-coated calcium carbonate-comprising material, to a process for the preparation of such a surface-coated calcium carbonate-comprising material as well as to a process for the purification of water and/or dewatering of sludges and/or suspended sediments by using such a surface-coated calcium carbonate-comprising material.

Water pollution is suggested as being the leading cause of death and diseases in developing countries. However, also industrialized countries continue struggling with such pollution problems and, therefore, water pollution has posed a serious problem all over the world. In general, water, sludges and sediments are referred to as being polluted when impaired by anthropogenic contaminants and either does not support a human use, such as serving as drinking water, and/or has negative impacts on aquatic and/or land based flora and fauna.

The specific contaminants or impurities leading to pollution in water, sludges and suspended sediments, include a wide variety of chemical substances, pathogens and physical or sensory changes such as elevated temperature, rheology/viscosity and discoloration. In this regard, the chemical contaminants may include organic substances as well as inorganic substances.

Sources of such water, sludge or sediment pollutions typically originate from urban waste waters or municipal waste water or from industrial waste waters. However, the contaminants and impurities may get in the natural water cycle and, therefore, the water, sludge and/or sediments comprising the contaminants or impurities may be, for example, lake water, river water, salty water such as for example brackish water, saline water or brine, sludges such as harbour sludge, ocean sludge or coastal sludge or suspended sediments from civil engineering such as drilling muds or brown coal sludge.

In the art, several approaches for the purification of polluted water and/or dewatering of sludges and/or suspended sediments have been proposed.

For instance, one approach involves the addition of flocculants to remove or at least to reduce the amount of contaminants such as fine solids, micro-organisms and dissolved inorganic and organic materials. Flocculation refers to a process where dissolved compounds and/or colloidal particles are removed from the solution in the form of flocs or "flakes." The term is also used to refer to the process by which fine particulates are caused to clump together into flocs. The flocs may then float to the top of the liquid, settle to the bottom of the liquid, or can be readily separated from the liquid by any separation techniques such as filtration, decantation, centrifugation or evaporation of the liquid.

Flocculants, or flocculating agents, are chemicals that are used to promote flocculation. Flocculants are used in water, especially in wastewater or in sludge and/or sediment treatment processes to improve the separation of the suspended or dissolved solids from the liquid phase by sedimentation or filterability of small particles for instance.

The most flocculants are inorganic salts containing multivalent cations such as aluminium, iron, calcium or magnesium. However, these positively charged ions interact merely with negatively charged particles and molecules to reduce the barriers to aggregation. Often the cationic contaminants still remain in the polluted water. Another problem with the addition of such flocculants, however, is that they tend to merely bind and agglomerate organic contaminants while inorganic impurities are still finely dispersed in the water sample. Furthermore, the flocculated material needs to be removed from the water phase by a dewatering process such as filtration or centrifugation so that the obtained filter cake can be further disposed by e.g. burning or further re-use. However, due to the overall incomplete flocculation process the water content in such obtained filter cakes is comparatively high resulting in a dramatically increased energy consumption on combustion. Furthermore, the filtration process is often very time consuming due to a low dewatering rate. Finally, the use of inorganic flocculants such as aluminum sulfate or iron chloride often results in a pH decrease. Therefore, it is often necessary to add in parallel alkalinity to the water, for example, in form of calcium hydroxide or sodium hydroxide, to keep the pH from dropping too low.

Another strategy involves the use of polymeric flocculation aids. A known polymeric flocculation aid is polyacrylamide. However, one problem with this approach is that these polymeric flocculation aids are usually overdosed to a large extent in order to ensure the agglomeration of all fine solid particles in the water to be treated. Thus, after the separation of the flocculated material from the water phase, the content of polyacrylamide in the filtrate is usually increased due to the high amounts of polymeric flocculating aids used. However, as there are severe environmental concerns regarding water containing polymeric flocculation aids, and especially polyacrylamide, the filtrate cannot be readily disposed in nature and, thus, further time and cost consuming purification steps are required to remove the polymeric flocculation aid from the filtrate. In addition the quality of the filter cake when using organic polymers for flocculation is usually poor due to the jelly-like composition of its resulting sludge. The obtained sludge is also hard to dewater to a high solid content and, therefore, the solid content remains quite low in such treated sludges. This has the consequence that the handling is quite complicated as the sludge cannot be handled as a semi-solid material that could be shoveled with appropriate equipment such as mechanical digger for instance, but would still require some powerful pumping.

Another approach involves the use of surface-reacted natural calcium carbonate as disclosed in EP 1 982 759. The surface-reacted natural calcium carbonate may be used in combination with a polymeric flocculant. However, the polymeric flocculant is dissolved in the suspension and, therefore, similar drawbacks as described above may occur.

EP 2 011 766 refers to the use of surface-reacted natural calcium carbonate and a hydrophobic adsorbent. However, this combination is contemplated for removal of organic components from waste water.

Another approach involves the use of surface-treated calcium carbonate, wherein at least a part of the accessible surface area of the calcium carbonate is covered by a coating comprising at least one cationic polymer as disclosed in EP 2 589 430 or WO 2014/180631. However, by using these cationic species obviously only specific contaminants and impurities can be removed from the polluted water, sludges and/or sediments. More precisely, only anionic contaminants or impurities can be removed from the polluted water, sludges and/or sediments.

Therefore, there is a continuous need for alternative agents or substances that can be used in a water treatment process, especially in a wastewater, sludge and/or sediment treatment process which provide a better performance than existing flocculants or may be used for improving or supplementing the performance of existing agents and substances.

In this respect, one object of the present invention may be seen in the provision of alternative agents or substances that can be used in a process for the purification of water and/or dewatering of sludges and/or suspended sediments, which provide a better or supplementary performance than existing flocculants and effectively decrease the concentration of impurities and the concentration of polymeric flocculation aids in waste water to be treated while they preferably at the same time enable easy performance at low cost.

Another object may be seen in the provision of agents or substances that can be used in a water treatment process, especially in a wastewater, sludge and/or sediment treatment process wherein the water comprises cationic contaminants and impurities, especially cationic inorganic contaminants and impurities.

Still another object of the present invention may be seen in the provision of agents or substances that can be used in a process for purification of water and/or dewatering of sludges and/or suspended sediments that are obtained from salty water like brackish water or saline water or brine.

A further object of the present invention may be seen in the provision of agents or substances that facilitate the dewatering or filtration of sludges or suspended sediments.

The foregoing and other objects are solved by the subject-matter of the present invention as defined in the independent claims.

A first aspect of the present invention relates to a surface-coated calcium carbonate-comprising material, characterized in that the calcium carbonate comprises at least one surface-reacted calcium carbonate-comprising mineral material and/or a surface-reacted precipitated calcium carbonate and the coating comprises at least one anionic polymer.

The inventors surprisingly found that surface-coated calcium carbonate-comprising material that may be obtained by coating surface-reacted calcium carbonate-comprising mineral materials and/or surface-reacted precipitated calcium carbonates with anionic polymers may be effectively used for the purification of water and/or dewatering of sludges and/or suspended sediments. The inventors found that such surface-coated calcium carbonate-comprising material provides excellent binding activity for impurities when the at least one surface-coated calcium carbonate-comprising material is at least partially applied onto the surface of the water and/or sludge and/or sediment to be treated or mixed with the water and/or sludge and/or suspended sediment to be treated. Furthermore, such a water treatment process results in a composite material of surface-coated calcium carbonate-comprising materials and impurities which can be easily removed from the medium to be treated. The binding of impurities by the inventive surface-coated calcium carbonate-comprising material results in a good cleansing quality of the water and/or sludge and/or suspended sediment to be treated as well as of the obtained filter cake. In this context a good and fast settlement of the flocs is reached which leads to shorter filtration periods and, therefore, to reduced treatment costs.

The surface-coated calcium carbonate-comprising material may lead to a reduced amount of anionic polymeric flocculation aid in the treated water and/or sludge and/or sediment and, thus, decreases the disturbance of the ecological balance. Furthermore, by using the inventive surface-coated calcium carbonate-comprising material the quality of the obtained filter cake may be increased so that the subsequent disposal is less energy-consuming.

Furthermore, the inventors found that the inventive surface-coated calcium carbonate-comprising material is especially suitable for the purification of water and/or dewatering of sludges and/or suspended sediments that are obtained from salty water like brackish water and/or saline water and/or brine.

According to another aspect of the present invention a process for the preparation of a surface-coated calcium carbonate-comprising material is provided comprising the following steps:

a') providing at least one surface-reacted calcium carbonate-comprising mineral material and/or a surface-reacted precipitated calcium carbonate, b') providing at least one anionic polymer, c') contacting the at least one surface-reacted calcium carbonate-comprising mineral material and/or surface-reacted precipitated calcium carbonate of step a') and the at least one anionic polymer of step b') for obtaining a surface-coated calcium carbonate-comprising material.

According to another aspect of the present invention a process for the purification of water and/or dewatering of sludges and/or suspended sediments is provided, comprising the following steps:

A') providing water to be purified and/or sludge and/or suspended sediment to be dewatered comprising impurities;

B') providing at least one surface-coated calcium carbonate-comprising material, and C') contacting the water and/or sludge and/or suspended sediment of step A') with the at least one surface-coated calcium carbonate-comprising material of step B') for obtaining a composite material of surface-coated calcium carbonate-comprising material and impurities.

Another aspect of the present invention relates to the use of a surface-coated calcium carbonate-comprising material for water purification and/or dewatering of sludges and/or suspended sediments.

According to another aspect of the present invention a composite material comprising a surface-coated calcium carbonate-comprising material and impurities is provided, wherein said composite material is obtainable by the above processes.

The following terms used throughout the present application shall have the meanings set forth hereinafter:

Where in this application it is described that a compound (especially the anionic polymer) is "coated onto" or "loaded onto" a (particulate) calcium carbonate-comprising material this means that said compound may be generally present on all or part of the sites of the particle which are directly accessible from the outside of said particle. These sites include the outer surface of a particle as well as pores or cavities being accessible from the outer surface.

The term "accessible surface area" or "accessible outer surface" in the meaning of the present invention refers to the surface of the calcium carbonate-comprising material particle that is accessible or exposed to the at least one anionic polymer applied by mixing and/or coating techniques known to the skilled person and thereby forming a monolayer of anionic polymer on the surface of the calcium carbonate-comprising material particle. In this regard, it should be noted that the amount of anionic polymer required for full saturation of the accessible surface area is defined as a monolayer concentration. Higher concentrations thus can be chosen by forming bilayered or multi-layered structures on the surface of the calcium carbonate-comprising material particle. Such monolayer concentrations can be readily calculated by the skilled person, based on the publication of Papirer, Schultz and Turchi (Eur. Polym. J., Vol. 20, No. 12, pp. 1155-1158, 1984).

The term "particulate" in the meaning of the present application refers to materials composed of a plurality of particles. Said plurality of particles may be defined, for example, by its particle size distribution.

The term "solid" refers to a physical state of a material. Unless indicated otherwise, this physical state is to be observed at a temperature of 20° C.

The "absolute water solubility" of a compound is to be understood as the maximum concentration of a compound in water where one can observe a single phase mixture at 20° C. under equilibrium conditions. The absolute water solubility is given in g compound per 100 g water.

The "particle size" of particulate materials other than the surface-reacted calcium carbonate-comprising mineral material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are bigger and 50 wt.-% are smaller than that particle size. For the purpose of the present invention, the particle size is specified as weight median particle size $d_{50}$ unless indicated otherwise. Particle sizes were determined by using a Sedigraph™ 5100 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate-comprising mineral material herein is described as volume-based particle size distribution. For determining the volume-based particle size distribution, e.g., the volume-based median particle diameter ($d_{50}$) or the volume-based top cut particle size ($d_{98}$) of the surface-reacted calcium carbonate-comprising mineral material, a Malvern Mastersizer 2000 Laser Diffraction System with a defined RI of 1.57 and iRI of 0.005 and Malvern Application Software 5.60 was used. The measurement was performed with an aqueous dispersion. For this purpose, the samples were dispersed using a high-speed stirrer. The weight determined particle size distribution may correspond to the volume determined particle size if the density of all the particles is equal. Alternatively, the "particle size" may be defined by the weight median diameter.

The "specific surface area" (expressed in $m^2/g$) of a material as used throughout the present document can be determined by the Brunauer Emmett Teller (BET) method with nitrogen as adsorbing gas and by use of a Gemini V instrument from Micromeritics. The method is well known to the skilled person and defined in ISO 9277:1995. Samples are conditioned at 250° C. for a period of 30 min prior to measurement. The total surface area (in $m^2$) of said material can be obtained by multiplication of the specific surface area (in $m^2/g$) and the mass (in g) of the material.

In the context of the present invention, the term "pore" is to be understood as describing the space that is found between and/or within particles, i.e. that is formed by the particles as they pack together under nearest neighbour contact (interparticle pores), such as in a powder or a compact and/or the void space within porous particles (intraparticle pores), and that allows the passage of liquids under pressure when saturated by the liquid and/or supports absorption of surface wetting liquids.

The "intraparticle intruded specific pore volume" according to the present invention can be calculated from a mercury intrusion porosimetry measurement and describes the measured pore volume that is found inside the pigment particles per unit mass of sample containing the particles. The intruded total specific void volume represents the sum of all the individual pore volumes, which can be intruded by mercury, per unit mass of the sample can be measured by mercury porosimetry using a Micrometrics Autopore IV mercury porosimeter. An exemplary mercury porosimetry experiment entails the evacuation of a porous sample to remove trapped gases, after which the sample is surrounded with mercury. The amount of mercury displaced by the sample allows calculation of the sample's bulk volume, Vbulk. Pressure is then applied to the mercury so that it intrudes into the sample through pores connected to the external surface. The maximum applied pressure of mercury can be 414 MPa, equivalent to a Laplace throat diameter of 0.004 μm. The data can be corrected using Pore-Comp (P. A. C. Gane et al. "Void Space Structure of Compressible Polymer Spheres and Consolidated Calcium Carbonate Paper-Coating Formulations", Industrial and Engineering Chemistry Research 1996, 35 (5):1753-1764) for mercury and penetrometer effects, and also for sample compression. By taking the first derivative of the cumulative intrusion curves the pore size distributions based on equivalent Laplace diameter, inevitably including the effect of pore-shielding when present, are revealed. The intruded total specific void volume corresponds to the void volume per unit mass of the sample determined by mercury porosimetry.

If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 120° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

"Conductivity" according to the present invention shall mean the electrical conductivity of an aqueous suspension or solution, for example, an aqueous suspension or solution of salty water as measured according to the measurement method defined in the examples section herebelow.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the inventive surface-coated calcium carbonate-comprising material as well as of its use are defined in the corresponding subclaims.

According to one embodiment of the present invention the surface-reacted calcium carbonate-comprising mineral material is a reaction product obtainable by contacting a calcium carbonate-comprising mineral material in an aqueous medium with carbon dioxide and with at least one water soluble acid, wherein the carbon dioxide is formed in situ and/or is supplied from an external source.

According to another embodiment of the present invention the at least one water soluble acid is selected from:
i) acids having a p$K_a$ value of 0 or less at 20° C. (strong acids) or having a p$K_a$ value from 0 to 2.5 at 20° C. (medium strong acids); and/or
ii) acids having a p$K_a$ of greater than 2.5 and less than or equal to 7 at 20° C. (weak acids), wherein at least one water soluble salt, which in the case of a hydrogen-containing salt has a p$K_a$ of greater than 7 and the salt anion of which is capable of forming water insoluble calcium salts, is additionally provided.

According to another embodiment of the present invention the surface-reacted precipitated calcium carbonate is a reaction product obtainable by:
a) providing precipitated calcium carbonate;
b) providing $H_3O^+$ ions;
c) providing at least one anion being capable of forming water insoluble calcium salts, said anion being solubilized in an aqueous medium; and
d) contacting the precipitated calcium carbonate of step a) with said $H_3O^+$ ions of step b) and with said at least one anion of step c) to form a slurry of surface-reacted precipitated calcium carbonate;
characterized in that an excess of solubilized calcium ions is provided during step d); and
said surface-reacted precipitated calcium carbonate comprises an insoluble and at least partially crystalline calcium salt of said anion formed on the surface of at least part of the precipitated calcium carbonate provided in step a).

According to another embodiment of the present invention:
I) the $H_3O^+$ ions of step b) are provided by addition of a water soluble acid or acidic salt which simultaneously serves to provide all or part of said excess solubilized calcium ions, preferably selected from the group comprising sulfur-comprising acids, such as sulfuric acid, hydrochloric acid, perchloric acid, formic acid, lactic acid, acetic acid, nitric acid, and acidic salts thereof, such as water soluble calcium acidic salts thereof;
II) the anion of step c) is selected from one or more of the following: phosphate-comprising anions such as $PO_4^{3-}$ and $HPO_4^{2-}$, oxalate anions ($C_2O_4^{2-}$), carbonate-comprising anions in the form of $CO_3^{2-}$, phosphonate anions, succinate anions or fluoride anions; and/or
III) the excess of solubilized calcium ions is provided by addition of a water soluble neutral or acidic calcium salt, preferably selected from one or more of the following sources: $CaCl_2$ or $Ca(NO_3)_2$.

According to another embodiment of the present invention:
A) the calcium carbonate-comprising mineral material is selected from the group consisting of marble, chalk, dolomite, limestone, and mixtures thereof and preferably is marble; and/or
B) the precipitated calcium carbonate is selected from the group consisting of precipitated calcium carbonates having an aragonitic, vateritic or calcitic crystal form, and mixtures thereof.

According to another embodiment of the present invention the calcium carbonate particles of the at least one surface-reacted calcium carbonate-comprising mineral material and/or surface-reacted precipitated calcium carbonate have a volume median particle diameter $d_{50}$ value before coating of between 0.01 µm and 250 µm, preferably between 0.06 µm and 225 µm, more preferably between 1 µm and 200 µm, even more preferably between 1 µm and 150 µm and most preferably between 1 µm and 100 µm and/or the calcium carbonate particles of the at least one surface-reacted calcium carbonate-comprising mineral material and/or surface-reacted precipitated calcium carbonate have a specific surface area before coating of from 1 to 250 m$^2$/g, more preferably from 20 to 200 m$^2$/g, even more preferably from 30 to 150 m$^2$/g and most preferably from 30 to 100 m$^2$/g.

According to another embodiment of the present invention the at least one anionic polymer has a negative overall charge density in the range of 1 mEq/g (negative charge) to 15000 mEq/g (negative charge), more preferably in the range of 1000 mEq/g (negative charge) to 10000 mEq/g (negative charge) and most preferably in the range of 2000 µEq/g (negative charge) to 8000 mEq/g (negative charge) and/or wherein at least 60% of the monomer units of the at least one anionic polymer have an anionic charge, preferably at least 70%, more preferably at least 80%, even more preferably at least 90% and most preferably equal to 100%.

According to another embodiment of the present invention the at least one anionic polymer is a homopolymer based on monomer units selected from the group consisting of aliphatic unsaturated carboxylic acids having a total amount of 1 to 24 carbon atoms, vinylsulfonic acid, vinylphosphonic acid, esterified acrylates, esterified methacrylates and esterified carbohydrates and preferably is selected from acrylic acid and methacrylic acid and most preferably is acrylic acid.

According to another embodiment of the present invention the at least one anionic polymer is a copolymer based on monomer units selected from the group consisting of aliphatic unsaturated carboxylic acids having a total amount of 1 to 24 carbon atoms, vinylsulfonic acid, vinylphosphonic acid, esterified acrylates, esterified methacrylates and esterified carbohydrates and comonomer units selected from the group consisting of acrylamide; acrylic acid, methacrylic acid, vinylsulfonic acid, vinylpyrrolidone, methacrylamide; N,N-dimethyl acrylamide; styrene; methyl methacrylate, vinyl acetate and mixtures thereof, preferably the monomer units are selected from acrylic acid and/or methacrylic acid and the comonomer units are selected from acrylamide and/or diallyldialkyl ammonium salts.

According to another embodiment of the present invention the at least one anionic polymer is a natural homopolymer selected from the group consisting of anionic starch, anionic carboxymethylcellulose, anionic carboxylated cellulose, heparin, anionic dextrane and anionic mannan or is a natural copolymer based on anionic starch, anionic carboxymethylcellulose, anionic carboxylated cellulose, heparin, anionic dextrane or anionic mannan.

According to another embodiment of the present invention the surface-coated calcium carbonate-comprising material additionally comprises mineral materials selected from the group consisting of untreated and/or treated ground calcium carbonate (GCC), precipitated calcium carbonate (PCC), surface-reacted calcium carbonate (MCC), kaolin, clay, talc, bentonite, dolomite or combinations thereof.

According to another embodiment of the present invention step c') of the process for the preparation of the surface-coated calcium carbonate-comprising material is performed in an aqueous solution.

According to another embodiment of the present invention the water and/or sludge and/or suspended sediment of step A') is selected from lake water, river water, water reservoirs, canal water, stream water, brooks water, salty water like brackish water, saline water or brine, estuary water, mining runoff water, mining wash water, sludge such as harbour sludge, river sludge, ocean sludge, or coastal sludge, suspended sediments from civil engineering such as drilling muds, shield wall tunnelling, horizontal directional drilling, micro tunnelling, pipe-jacking, industrial drilling and mining and preferably is brackish water, saline water or brine.

According to another embodiment of the present invention the water and/or sludge and/or suspended sediment of step A') is selected from drinking water, urban waste water, municipal waste water, industrial waste water, sludge from biogas production or digested sludge, waste water or process water from breweries or other beverage industries, waste water or process water in the paper industry, colour-, paints-, or coatings industry, agricultural waste water, slaughterhouse waste water, leather industry waste water and leather tanning industry, process water and waste water and sludges from on and offshore oil and/or gas industry.

According to another embodiment of the present invention the water and/or sludge and/or suspended sediment of step A') is salty water having a conductivity in the range of between 185 µS/cm and 350000 µS/cm, preferably in the range of between 1000 µS/cm and 300000 µS/cm, more preferably in the range of between 5000 µS/cm and 240000 µS/cm, even more preferably in the range of between 10000 µS/cm and 150000 µS/cm, even more preferably in the range of between 41000 µS/cm and 100000 µS/cm, and most preferably in the range of between 65000 µS/cm and 80000 µS/cm.

According to another embodiment of the present invention the surface-coated calcium carbonate-comprising material is used in a weight ratio of from 1:20000 to 1:30, preferably from 1:10000 to 1:35, more preferably from 1:1000 to 1:40 and most preferably from 1:850 to 1:45 on a dry weight basis relative to the weight of the dry impurities and/or sludge and/or sediment.

In the following, preferred embodiments of the inventive surface-coated calcium carbonate-comprising material as well as of the process for the preparation of that surface-coated calcium carbonate-comprising material will be discussed in more detail. It is to be understood that these details and embodiments also apply to the inventive process for the purification of water and/or dewatering of sludges and/or suspended sediments as well as to the use of said surface-coated calcium carbonate-comprising material and to the composite material comprising said surface-coated calcium carbonate-comprising material and impurities.

The Surface-Coated Calcium Carbonate-Comprising Material

The present invention refers to a surface-coated calcium carbonate-comprising material. Said material is characterized in that the calcium carbonate material comprises at least one surface-reacted calcium carbonate-comprising mineral material and/or a surface-reacted precipitated calcium carbonate.

The term "surface-reacted" (e.g., surface-reacted calcium carbonate-comprising mineral material or surface-reacted precipitated calcium carbonate) in the meaning of the present invention shall be used to indicate that a material has been subjected to a process comprising partial dissolution of said material upon acidic treatment (e.g., by use of water soluble free acids and/or acidic salts) in aqueous environment followed by a crystallization process which may occur in the absence or presence of further crystallization additives. The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

The surface-reacted calcium carbonate-comprising mineral material and/or the surface-reacted precipitated calcium carbonate used according to the present invention has a surface which differs from the surface of a corresponding untreated calcium carbonate-comprising mineral material and/or precipitated calcium carbonate, respectively, and which provides unique properties to the material.

Although less common, a "surface-reacted" material may be additionally or alternatively characterized by an increased intraparticle intruded specific pore volume as compared to the untreated starting material (i.e. calcium carbonate-comprising mineral material or precipitated calcium carbonate). Said increased pore volume or porosity is a result of the dissolution and recrystallisation process during its formation. Usually, the starting materials do not show any or only low internal porosity.

The uncoated calcium carbonate particles of the present invention, namely the calcium carbonate particles of the at least one surface-reacted calcium carbonate-comprising mineral material and/or surface-reacted precipitated calcium carbonate may have a volume median particle diameter $d_{50}$ value before coating of between 0.01 µm and 250 µm, preferably between 0.06 µm and 225 µm, more preferably between 1 µm and 200 µm, even more preferably between 1 µm and 150 µm and most preferably between 1 µm and 100 µm. Alternatively, the calcium carbonate particles of the at least one surface-reacted calcium carbonate-comprising mineral material and/or surface-reacted precipitated calcium carbonate may be described by their weight median diameter. In this context, the value $d_x$ represents the diameter relative to which x % by weight of the particles have diameters of less than $d_x$. The $d_{50}$ value is thus the "weight median particle size" at which 50 wt.-% of all particles are smaller than the indicated particle size. Particle sizes being smaller than 45 µm can be determined based on measurements made by using a Sedigraph™ 5100 instrument of Micromeritics Instrument Corporation. The method and the instrument are known to the skilled person and are commonly used to determine the particle size of fillers and pigments. The measurements are carried out in an aqueous solution of 0.1 wt.-% $Na_4P_2O_7$. Samples are dispersed using a high speed stirrer and supersonics. In case of particle sizes being 45 µm or larger, fractional sieving according to the ISO 3310-1:2000 standard may be used to determine particle size distributions. The calcium carbonate particles of the at least one surface-reacted calcium carbonate-comprising mineral material and/or surface-reacted precipitated calcium carbonate according to the present invention preferably have a weight median particle diameter $d_{50}$ value before coating of between 0.01 µm and 250 µm, preferably between 0.06 µm and 225 µm, more preferably between 1 µm and 200 µm, even more preferably between 1 µm and 150 µm and most preferably between 1 µm and 100 µm.

Additionally or alternatively the calcium carbonate particles of the at least one surface-reacted calcium carbonate-comprising mineral material and/or surface-reacted precipitated calcium carbonate may have a specific surface area before coating of from 1 to 250 m$^2$/g, more preferably from 20 to 200 m$^2$/g, even more preferably from 30 to 150 m$^2$/g and most preferably from 30 to 100 m$^2$/g, measured using nitrogen and the BET method according to ISO 9277.

Preferably, the uncoated surface-reacted calcium carbonate-comprising mineral material and/or surface-reacted precipitated calcium carbonate has an intraparticle intruded specific pore volume within the range of 0.15 to 1.3 cm$^3$/g, preferably of 0.3 to 1.25 cm$^3$/g, and most preferably of 0.4 to 1.22 cm$^3$/g, calculated from mercury intrusion porosimetry measurement as described herein. The total pore volume seen in the cumulative intrusion data can be separated into two regions with the intrusion data from 214 µm down to about 1 to 4 µm showing the coarse packing of the sample between any agglomerate structures contributing strongly. Below these diameters lies the fine interparticle packing of the particles themselves. If they also have intraparticle pores, then this region appears bimodal. The sum of these three regions gives the total overall pore volume of the powder, but depends strongly on the original sample compaction/settling of the powder at the coarse pore end of the distribution. Further details with respect to the porosity or the intraparticle intruded specific pore volume of the surface-reacted calcium carbonate can be found in WO 2010/037753.

The surface-coated calcium carbonate-comprising material may additionally comprise mineral materials selected from the group consisting of untreated and/or treated ground calcium carbonate (GCC), precipitated calcium carbonate (PCC), surface-reacted calcium carbonate (MCC), kaolin, clay, talc, bentonite or dolomite and preferably dolomite.

In the following, the starting substances or components (surface-reacted calcium carbonate-comprising mineral material and surface-reacted precipitated calcium carbonate and the anionic polymer) will be described in more detail.

The Surface-Reacted Calcium Carbonate-Comprising Mineral Material

The term "calcium carbonate-comprising mineral material" in the meaning of the present application is to be understood as a material of natural origin containing calcium carbonate and having an ordered atomic structure, such as marble, chalk, dolomite, or limestone. The calcium carbonate-comprising mineral material according to the present invention is used in a comminuted form, preferably in ground form, to provide the desired particle size distribution.

The surface-reacted calcium carbonate-comprising mineral material used according to the present invention is a reaction product obtainable by contacting a calcium carbonate-comprising mineral material in an aqueous medium with carbon dioxide and with at least one water soluble acid, wherein the carbon dioxide is formed in situ by the acid treatment and/or is supplied from an external source.

The expression "acid treatment" in the meaning of the present invention refers to the reaction of the calcium carbonate-comprising mineral material or precipitated calcium carbonate and the at least one water soluble acid in the aqueous medium. By this reaction carbon dioxide can be formed in situ in the aqueous medium.

A ground calcium carbonate-comprising mineral material (GCC) is understood to be a naturally occurring form of calcium carbonate, mined from sedimentary rocks such as limestone or chalk, or from metamorphic marble rocks. Calcium carbonate is known to exist mainly as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Natural calcium carbonate is almost exclusively of the calcitic polymorph, which is said to be trigonal-rhombohedral and represents the most stable of the calcium carbonate polymorphs. The source of the calcium carbonate may comprise further naturally occurring components such as magnesium carbonate, alumino silicate etc. The term "source" of the calcium carbonate in the meaning of the present invention refers to the naturally occurring mineral from which the calcium carbonate is obtained.

According to one embodiment of the present invention, the calcium carbonate-comprising mineral material is selected from the group consisting of marble, chalk, dolomite, limestone, and mixtures thereof and preferably is marble.

According to one embodiment of the present invention, the calcium carbonate-comprising mineral material is obtained by dry grinding. According to another embodiment of the present invention, the calcium carbonate-comprising mineral material is obtained by wet grinding and optionally subsequent drying.

In general, the grinding step can be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising mineral material comprises a wet calcium carbonate-comprising mineral material, the grinding step may be performed under conditions such that autogenous grinding takes place and/or by horizontal ball milling, and/or other such processes known to the skilled man. It is to be noted that the same grinding methods can be used for dry grinding the calcium carbonate-comprising mineral material. The wet processed calcium carbonate-comprising mineral material thus obtained may be washed and dewatered by well-known processes, e.g. by flocculation, filtration or forced evaporation prior to drying. The subsequent step of drying may be carried out in a single step such as spray drying, or in at least two steps. It is also common that such a mineral material is subjected to a beneficiation step (such as a flotation, bleaching or magnetic separation step) to remove impurities.

In a preferred embodiment, the calcium carbonate-comprising mineral material is ground prior to its conversion into the surface-reacted form. The grinding step can be carried out with any conventional grinding device such as a grinding mill known to the skilled person.

In a preferred process, the calcium carbonate-comprising mineral material, either finely divided, such as by grinding, or not, is suspended in water to produce a slurry. Preferably, the slurry has a solids content within the range of from 1 to 80 wt.-%, more preferably 3 to 60 wt.-%, and even more preferably 5 to 40 wt.-%, based on the total weight of the slurry.

In a next step, at least one water soluble acid is added to the aqueous suspension containing the calcium carbonate-comprising mineral material. In general, the at least one acid can be any water soluble free acid selected from strong acids, medium strong acids, or weak acids, or mixtures thereof, generating $H_3O^+$ ions under the preparation conditions.

According to one embodiment, the at least one water soluble acid is a free acid selected from strong acids having a pKa of 0 or less at 20° C. According to another embodiment, the at least one water soluble acid is a free acid selected from medium strong acids having a pKa value from 0 to 2.5 at 20° C. If the pKa at 20° C. is 0 or less, the acid is preferably selected from sulfuric acid, hydrochloric acid, or mixtures thereof. If the pKa at 20° C. is from 0 to 2.5, the acid is preferably selected from $H_2SO_3$, $H_3PO_4$, oxalic acid, or mixtures thereof. According to a preferred embodiment, the least one water soluble acid is $H_3PO_4$.

In accordance with the present invention, "pKa" is the symbol representing the negative log 10 of the acid dissociation constant associated with a given ionisable hydrogen in a given acid and is indicative for the natural degree of dissociation of this hydrogen from this acid at equilibrium in water at a given temperature. Such pKa values may be found in reference textbooks such as Harris, D. C. "Quantitative Chemical Analysis: 3rd Edition", 1991, W.H. Freeman & Co. (USA), ISBN 0-7167-2170-8, or CRC Handbook of Chemistry and Physics, 1994-1995 75th edition, 8-43 to 8-55, CRC Press Inc., 1995.

Additionally or alternatively, the at least one water soluble acid can also be a water soluble acidic salt which is capable to generate $H_3O^+$ ions under the preparation conditions, for example, $HSO_4^-$ or $H_2PO_4^-$, being at least partially neutralized by a corresponding cation such as $Li^+$, $Na^+$ or $K^+$, or $HPO_4^{2-}$, being at least partially neutralized by a corresponding cation such as $Li^+$, $Na^+$, $K^+$, $Mg^{2+}$ or $Ca^{2+}$. Therefore, the at least one water soluble acid can also be a mixture of one or more water soluble acids and one or more water soluble acidic salts.

According to still another embodiment, the at least one water soluble acid is a weak acid having a pKa value of greater than 2.5 and less than or equal to 7 at 20° C. and having a corresponding anion formed which is capable of forming water soluble calcium salts. According to a preferred embodiment, the weak acid has a pKa value from 2.6 to 5 at 20° C., and more preferably the weak acid is selected from the group consisting of acetic acid, formic acid, propanoic acid, and mixtures thereof.

In case a weak acid is used, after addition of said acid to the aqueous suspension containing the calcium carbonate-comprising mineral material, at least one water soluble salt, which in the case of a hydrogen-containing salt has a pKa of greater than 7 at 20° C. and the salt anion of which is capable of forming water insoluble calcium salts, must be additionally added. The cation of said water soluble salt is preferably selected from the group consisting of potassium, sodium, lithium and mixtures thereof. In a more preferred embodiment, said cation is sodium. It is of note that depending on the charge of the anion, more than one of said cations may be present to provide an electrically neutral ionic compound.

The anion of said water soluble salt is preferably selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water soluble salt addition may be performed dropwise or in one step. In the case of dropwise addition, this addition preferably takes place within a time period of 15 minutes. It is more preferred to add said salt in one step.

According to the present invention, the at least one water soluble acid may be selected from the group consisting of hydrochloric acid, sulfuric acid, sulfurous acid, phosphoric acid, citric acid, oxalic acid, acetic acid, formic acid, and mixtures thereof. Preferably the at least one water soluble acid is selected from the group consisting of hydrochloric acid, sulfuric acid, sulfurous acid, phosphoric acid, oxalic acid, $H_2PO_4^-$ being at least partially neutralized by a corresponding cation such as $Li^+$, $Na^+$ or $K^+$, $HPO_4^{2-}$ being at least partially neutralized by a corresponding cation such as $Li^+$, $Na^+$, $K^+$, $Mg^{2+}$ or $Ca^{2+}$, and mixtures thereof, more preferably the at least one water soluble acid is selected from the group consisting of hydrochloric acid, sulfuric acid, sulfurous acid, phosphoric acid, oxalic acid, or mixtures thereof, and most preferably, the at least one water soluble acid is phosphoric acid.

According to the present invention, the at least one water soluble acid may be a mixture of one or more water soluble acids. For example, the at least one water soluble acid is a mixture of phosphoric acid and citric acid. The one or more water soluble acids may be added simultaneously or successively.

The at least one water soluble acid can be added to the suspension as a concentrated solution or a more diluted solution. According to the present invention, the molar ratio of the at least one water soluble acid to the calcium carbonate-comprising mineral material may be from 0.01 to 0.6, preferably from 0.05 to 0.55, and more preferably from 0.1 to 0.5. As an alternative, it is also possible to add the at least one water soluble acid to the water before the calcium carbonate-comprising mineral material is suspended.

In a next step, the calcium carbonate-comprising mineral material is treated with carbon dioxide. The carbon dioxide can be formed in situ by the acid treatment and/or can be supplied from an external source. If a strong acid such as sulfuric acid or hydrochloric acid or a medium strong acid such as phosphoric acid is used for the acid treatment of the calcium carbonate-comprising mineral material, the carbon dioxide is automatically formed in a sufficient amount to achieve the required molar concentration. Alternatively or additionally, the carbon dioxide can be supplied from an external source.

Acid treatment and treatment with carbon dioxide can be carried out simultaneously which is the case when a strong or medium strong acid is used. It is also possible to carry out acid treatment first, e.g. with a medium strong acid having a pKa in the range of 0 to 2.5 at 20° C., wherein carbon dioxide is formed in situ, and thus, the carbon dioxide treatment will automatically be carried out simultaneously with the acid treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably from 1:0.05 to 1:5.

The acid treatment step and/or the carbon dioxide treatment step may be repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted calcium carbonate-comprising mineral material as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

According to the present invention, the surface-reacted calcium carbonate-comprising mineral material may be obtained by a process comprising the steps of:
a) providing a suspension of a calcium carbonate-comprising mineral material;
b) adding at least one water soluble acid having a pKa value of 0 or less at 20° C. or having a pKa value from 0 to 2.5 at 20° C. to the suspension of step a); and
c) treating the suspension of step a) with carbon dioxide before, during or after step b).

According to the present invention, at least one water soluble acid having a pKa value of 0 or less at 20° C. may be added in step b) to the suspension of step a). The at least one water soluble acid having a pKa value from 0 to 2.5 at 20° C. may be added in step b) to the suspension of step a).

The carbon dioxide used in step c) can be formed in situ by the acid treatment of step b) and/or can be supplied from an external source.

According to another embodiment of the present invention, the surface-reacted calcium carbonate-comprising mineral material may be obtained by a process comprising the steps of:
a) providing a calcium carbonate-comprising mineral material;
b) providing at least one water soluble acid;
c) providing gaseous carbon dioxide;
d) contacting said calcium carbonate-comprising mineral material of step a) with the at least one water soluble acid of step b) and with the carbon dioxide of step c); wherein
  i) the at least one water soluble acid of step b) has a pKa of greater than 2.5 and less than or equal to 7 at 20° C. and a corresponding anion is formed capable of forming a water soluble calcium salt; and
  ii) following contacting the at least one water soluble acid with the calcium carbonate-comprising mineral material, at least one water soluble salt, which in the case of a hydrogen-containing salt has a pKa of greater than 7 at 20° C. and the salt anion of which is capable of forming water insoluble calcium salts, is additionally provided.

According to the present invention, the calcium carbonate-comprising mineral material may be reacted with the at least one water soluble acid and/or the carbon dioxide in the presence of at least one compound selected from the group consisting of silicate, for example sodium silicate, magnesium oxide, citric acid, aluminium sulfate, aluminium nitrate, aluminium chloride, and mixtures thereof and preferably the compound is sodium silicate. These components can be added to an aqueous suspension comprising the calcium carbonate-comprising mineral material before adding the at least one water soluble acid and/or carbon dioxide or simultaneously.

The surface-reacted calcium carbonate-comprising mineral material to be used in the present invention may be provided in dry form or as a suspension.

According to the present invention, the surface-reacted calcium carbonate-comprising mineral material may comprise an insoluble, at least partially crystalline calcium salt of an anion of the at least one water soluble acid which is formed on the surface of the calcium carbonate-comprising mineral material. According to one embodiment, the insoluble, at least partially crystalline salt of an anion of the at least one water soluble acid covers the surface of the calcium carbonate-comprising mineral material at least partially, preferably completely. Depending on the employed at least one water soluble acid, the anion may be sulfate, sulfite, phosphate, citrate, oxalate, acetate and/or formate.

The Surface-Reacted Precipitated Calcium Carbonate

As already described hereinabove, the particulate solid carrier may also be a surface-reacted material prepared from precipitated calcium carbonate, i.e. surface-reacted precipitated calcium carbonate as described in EP 2 070 991 B1.

A "precipitated calcium carbonate" (PCC) in the meaning of the present application is a synthetic material and may be generally obtained by precipitation following a reaction of carbon dioxide and calcium hydroxide (hydrated lime) in an aqueous environment, or by precipitation in the presence of a calcium and a carbonate source in water. For example, precipitated calcium carbonate can be the product obtained by introducing calcium and carbonate salts (e.g., calcium chloride and sodium carbonate) into an aqueous environment. Such precipitated calcium carbonates may have a vateritic, calcitic or aragonitic structure and are described, for example, in EP 2 447 213 A1, EP 2 524 898 A1, EP 2 371 766 A1 and WO 2013/142473.

According to one embodiment of the present invention, the precipitated calcium carbonate is selected from the group consisting of precipitated calcium carbonates having aragonitic, vateritic or calcitic mineralogical crystal forms, and mixtures thereof.

For the purposes of the present invention, the surface-reacted precipitated calcium carbonate may be obtained by contacting precipitated calcium carbonate with $H_3O^+$ ions and with anions being solubilized in an aqueous medium and being capable of forming water insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acidic salt, and in absence of any further calcium ion or calcium ion generating source.

In one embodiment, a process to prepare surface-reacted precipitated calcium carbonate comprises the following steps:
a) providing precipitated calcium carbonate;
b) providing $H_3O^+$ ions;
c) providing at least one anion being capable of forming water insoluble calcium salts, said anion being solubilized in an aqueous medium; and
d) contacting the precipitated calcium carbonate of step a) with said $H_3O^+$ ions of step b) and with said at least one anion of step c) to form a slurry of surface-reacted precipitated calcium carbonate;

characterized in that an excess of solubilized calcium ions is provided during step d); and said surface-reacted precipitated calcium carbonate comprises an insoluble and at least partially crystalline calcium salt of said anion formed on the surface of at least part of the precipitated calcium carbonate provided in step a).

For the purpose of the present application, "insoluble" materials are defined as those which, when mixed with 100 ml of deionised water and filtered at 20° C. to recover the liquid filtrate, provide less than or equal to 0.1 g of recovered solid material following evaporation at 95 to 100° C. of 100 g of said liquid filtrate. "Soluble" materials are defined as materials leading to the recovery of greater than 0.1 g of solid material following evaporation at 95 to 100° C. of 100 g of said liquid filtrate. In order to assess whether a material is an insoluble or soluble material in the meaning of the present invention, the sample size is greater than 0.1 g, preferably 0.5 g or more.

Preferably, the slurry has a solids content within the range of from 1 to 80 wt.-%, more preferably 3 to 60 wt.-%, and even more preferably 5 to 40 wt.-%, based on the total weight of said slurry.

In said process, the $H_3O^+$ ions of step b) may be provided by one or more of the following routes:
IB: addition of a water soluble acid or acidic salt of said anion;
IIB: addition of a water soluble acid or acidic salt which simultaneously serves to provide all or part of said excess solubilized calcium ions, i.e. by direct addition of soluble calcium ions and/or by dissolution of the starting material to liberate calcium ions.

In the case of route IIB, said water soluble acid or acidic salt which simultaneously serves to provide all or part of said excess solubilized calcium ions is preferably selected from the group comprising sulfur-comprising acids, such as sulfuric acid, hydrochloric acid, perchloric acid, formic acid, lactic acid, acetic acid, nitric acid, and acidic salts thereof, such as water soluble calcium acidic salts thereof.

The anion of step c) may be selected from one or more of the following: phosphate-comprising anions such as $PO_4^{3-}$ and $HPO_4^{2-}$, oxalate anions ($C_2O_4^{2-}$), carbonate-comprising anions in the form of $CO_3^{2-}$, phosphonate anions, succinate anions or fluoride anions.

The excess solubilized calcium ions provided during step d) may be provided by one or more of the following routes:
IA: addition of a water soluble neutral or acidic calcium salt;
IIA: addition of a water soluble acid or neutral or acidic non-calcium salt which generates a water soluble neutral or acidic calcium salt in situ.

In a preferred embodiment, said excess solubilized calcium ions are provided by route IA, more preferably they may be selected from one or more of the following sources: $CaCl_2$ or $Ca(NO_3)_2$.

In general, the foregoing process may also be used to produce surface-reacted calcium carbonate-comprising mineral material from calcium carbonate-comprising mineral material.

In another preferred embodiment, the precipitated calcium carbonate is ground prior to the conversion into the surface-reacted form. Said grinding step can be carried out with any conventional grinding device such as a grinding mill known to the skilled person.

The Anionic Polymer

According to the present invention the coating of the surface-coated calcium carbonate-comprising material comprises at least one anionic polymer.

The term "anionic polymer" in the meaning of the present invention refers to any polymer providing a negative overall charge when bound to or coated on the calcium carbonate-comprising material. Thus, the presence of cationic monomer units is not excluded as long as there are still sufficient anionic monomer units providing a negative overall charge. The same applies for amphoteric polymers which provide an overall negative charge when bound to or coated onto the calcium carbonate-comprising mineral material.

In this regard, the at least one anionic polymer being comprised in the coating of the surface-coated calcium carbonate-comprising material may be selected from any anionic polymer having a negative overall charge density in the range of 1 µEq/g (negative charge) to 15000 µEq/g (negative charge). Preferably, the at least one anionic polymer is selected such that it has a negative overall charge density in the range of 1000 µEq/g (negative charge) to 10000 µEq/g (negative charge) and most preferably in the range of 2000 µEq/g (negative charge) to 8000 µEq/g (negative charge).

For example, the at least one anionic polymer has a negative overall charge density in the range of 2000 µEq/g (negative charge) to 3500 µEq/g (negative charge) or in the range of 7000 µEq/g (negative charge) to 8000 µEq/g (negative charge).

Additionally or alternatively, the at least one anionic polymer being comprised in the coating of the surface-coated calcium carbonate-comprising material is selected such that at least 60% of the monomer units carry an anionic charge. Preferably, the coating of the at least one surface-coated calcium carbonate-comprising material comprises at least one anionic polymer in which at least 70% of the monomer units have an anionic charge, more preferably at least 80% and even more preferably at least 90%. In one preferred embodiment of the present invention, the coating of the at least one surface-coated calcium carbonate-comprising material comprises at least one anionic polymer in which equal to 100%, preferably 100%, of the monomer units have an anionic charge.

In one embodiment of the present invention, the at least one anionic polymer has a weight average molecular weight Mw of at least 50000 g/mole, preferably from 50000 g/mole to below 1000000 g/mole, more preferably from 70000 to 750000 g/mole, even more preferably from 90000 to 650000 g/mole and most preferably from 100000 to 300000 g/mole.

According to one embodiment of the present invention, the coating of the present invention comprises a homopolymer and/or a copolymer of the at least one anionic polymer. For example, the surface-coated calcium carbonate-comprising material may be covered by a coating comprising a homopolymer or a copolymer of the at least one anionic polymer.

In one embodiment of the present invention, the coating of the at least one surface-coated calcium carbonate-comprising material comprises an anionic homopolymer. That is to say, the anionic polymer consists substantially, i.e. of equal or more than 99.5 wt.-%, of the respective monomer units.

In one embodiment of the present invention, only monomer units selected from the group consisting of aliphatic unsaturated carboxylic acids having a total amount of 1 to 24 carbon atoms, vinylsulfonic acid, vinylphosphonic acid, esterified acrylates, esterified methacrylates and esterified carbohydrates form the homopolymer.

The term "aliphatic unsaturated carboxylic acid" according to the present invention refers to monomers that comprise at least one acid group (COOH) and at least one carbon-carbon double bond. Aliphatic unsaturated carboxylic acids according to the present invention are, for example, acrylic acid, methacrylic acid, myristoleic acid, palmitoleic acid, sapienic acid, oleic acid, elaidic acid, vaccenic acid, linoleic acid, linoelaidic acid, arachidonic acid, erucic acid, itaconic acid.

According to the present invention the term "esterified" means that the hydroxyl group is chemically reacted with a group comprising an anionic charge. For example the hydroxyl group may be chemically reacted such that it carries a molecule comprising an acid group, for example a carbonic acid group, or a sulphonic acid group or a phosphonic acid group.

In one preferred embodiment of the present invention the coating of the at least one surface-coated calcium carbonate-comprising material comprises a homopolymer based on acrylic acid or methacrylic acid monomers.

For example, the at least one anionic polymer is polyacrylic acid, for example sodium polyacrylate.

Anionic polyacrylate polymers like polyacrylic acid are for example commercially sold by Nerolan Wassertechnik GmbH, Germany under the brandname Nerolan AG 580.

In one embodiment of the present invention, the at least one anionic polymer is polyacrylic acid having a weight average molecular weight Mw of at least 50000 g/mole, preferably from 50000 g/mole to below 1000000 g/mole, more preferably from 70000 to 750000 g/mole, even more preferably from 90000 to 650000 g/mole and most preferably from 100000 to 300000 g/mole.

In case the anionic polymer is a copolymer, it is appreciated that the copolymer comprises monomers copolymerizable with suitable comonomers. Preferably, the anionic polymer being a copolymer according to this invention comprises monomer units selected from the group consisting of aliphatic unsaturated carboxylic acids having a total amount of 1 to 24 carbon atoms, vinylsulfonic acid, vinylphosphonic acid, esterified acrylates, esterified methacrylates and esterified carbohydrates and comonomer units selected from the group consisting of acrylamide, acrylic acid, methacrylic acid, vinylsulfonic acid, vinylpyrrolidone, methacrylamide, N,N-dimethyl acrylamide, styrene, methyl methacrylate, vinyl acetate, diallyldialkyl ammonium salt and mixtures thereof.

In one embodiment of the present invention, the anionic polymer is a copolymer comprising, preferably consisting of, monomer units selected from methacrylic acid and/or acrylic acid and comonomer units selected from the group consisting of acrylamide and/or diallyldialkyl ammonium salt.

For example, the coating of the surface-coated calcium carbonate-comprising material may comprise an anionic polymer as described in EP 0 441 037.

The anionic polymer of the present invention may comprise cationic monomers as long as there are still sufficient anionic monomer units providing a negative overall charge. These cationic monomers or groups may, for example, be selected from the group consisting of diallyldimethyl ammonium bromide, diallyldimethyl ammonium chloride, diallyldimethyl ammonium phosphate, diallyldiethyl ammonium sulfate, diallyldiethyl ammonium bromide, diallyldiethyl ammonium chloride, diallyldiethyl ammonium phosphate, diallyldiethyl ammonium sulphate, diallyldipropyl ammonium bromide, diallyldipropyl ammonium chloride, diallyldipropyl ammonium phosphate and diallyldipropyl ammonium sulphate. In one embodiment of the present invention, the diallyldialkyl ammonium salt monomers are diallyldimethyl ammonium chloride monomers.

According to one embodiment, the coating of the at least one surface-coated calcium carbonate-comprising material comprises a copolymer of the at least one anionic polymer, wherein the monomer and comonomer units are derivable from acrylic acid and acrylamide only.

According to another embodiment of the present invention, the coating of the at least one surface-coated calcium carbonate-comprising material comprises a copolymer as the at least one anionic polymer, wherein the monomer and comonomer units are derivable from methacrylic acid and acrylic acid only.

In one embodiment of the present invention, the coating of the at least one surface-coated calcium carbonate comprising material comprises a copolymer, wherein the molar ratio of monomer units and comonomer units is from 5:1 to 1:5, more preferably from 4:1 to 1:4, even more preferably from 3:1 to 1:3 and most preferably from 3:1 to 1:1.

According to another embodiment of the present invention the coating comprises at least one anionic polymer that is a natural homopolymer selected from the group consisting of anionic starch, anionic carboxymethylcellulose, anionic carboxylated cellulose, heparin, anionic dextrane and anionic mannan or is a natural copolymer based on anionic starch, anionic carboxymethylcellulose, anionic carboxylated cellulose, heparin, anionic dextrane or anionic mannan.

For example, the coating of the surface-coated calcium carbonate-comprising material may comprise a natural anionic polymer as described in WO 2011/135150.

In one embodiment of the present invention, the anionic polymer comprises a mixture of at least two anionic polymers. Preferably, if the anionic polymer comprises a mixture of at least two anionic polymers, one anionic polymer is a homopolymer based on acrylic acid or methacrylic acid. Alternatively, if the anionic polymer comprises a mixture of at least two anionic polymers, one anionic polymer is a copolymer based on acrylic acid or methacrylic acid.

In one embodiment of the present invention, the anionic polymer comprises a mixture of two anionic polymers, wherein one anionic polymer is polyacrylic acid and the other one is selected from the group consisting of a homopolymer based on acrylic acid, and a copolymer based on methacrylic acid and acrylic acid.

If the anionic polymer comprises a mixture of two anionic polymers, the molar ratio of the polyacrylic acid and the second anionic polymer is from 99:1 to 1:99, more preferably from 50:1 to 1:50, even more preferably from 25:1 to 1:25 and most preferably from 10:1 to 1:10. In one especially preferred embodiment of the present invention, the molar ratio of the polyacrylic acid and the second anionic polymer is from 90:1 to 1:1, more preferably from 90:1 to 10:1 and most preferably from 90:1 to 50:1.

According to one embodiment the at least one anionic polymer is present in the coating covering the calcium carbonate-comprising material in a quantity between 0.01% w/w and 80% w/w of the dry weight of the coating. For example, the at least one anionic polymer is present in the coating covering the calcium carbonate-comprising material in a quantity less than 80% w/w, more preferably less than 60% w/w and most preferably less than 50 w/w of the dry weight of the coating.

According to another preferred embodiment the coating consists only of the at least one anionic polymer.

In another embodiment of the present invention, the at least one anionic polymer is present on the calcium carbonate-comprising material in an amount of about 0.1 wt.-% to 30 wt.-%, more preferably of about 0.1 wt.-% to 20 wt.-%, even more preferably of about 0.2 wt.-% to 15 wt.-% even more preferably of about 0.2 wt.-% to 10 wt.-%, and most preferably of about 0.5 to 5 wt.-%, based on the dry weight of the calcium carbonate-comprising material. For example, the at least one anionic polymer is present on the calcium carbonate-comprising material in an amount of 1.0 wt.-% to 2.5 wt.-%, based on the dry weight of the calcium carbonate-comprising material, for example in an amount of 1.2 wt.-% or 2.0 wt.-%, based on the dry weight of the calcium carbonate-comprising material.

In one embodiment of the present invention, the at least one anionic polymer has a solubility in water of above 50 g/100 ml of water, preferably of above 75 g/100 ml of water, even more preferably of above 100 g/100 ml of water and most preferably of above 150 g/100 ml of water. In one especially preferred embodiment, the at least one anionic polymer is readily soluble in water.

The Process for the Preparation of the Surface-Coated Calcium Carbonate-Comprising Material Generally, the coating of the at least one anionic polymer onto the surface-coated calcium carbonate-comprising material is effected by contacting the particulate at least one surface-reacted calcium carbonate-comprising mineral material and/or surface-reacted precipitated calcium carbonate with the at least one anionic polymer. Preferably the contacting is performed with a solution or suspension of the at least one anionic polymer in a suitable medium or solvent, for example acetone, or an alcohol or water and/or mixtures thereof. An alcohol according to the present invention is an organic compound in which the hydroxyl functional group (—OH) is bound to a saturated carbon atom. Suitable alcohols for the present invention are, but not limited to, for example, methanol, ethanol, propanol, butanol and pentanol. After the coating or association with the at least one anionic polymer, the excess liquid may be removed, e.g. by filtration, and optionally dried. With respect to the drying of the surface-coated calcium carbonate-comprising material, it is preferred to apply a well-controlled drying method, such as gentle spray drying or oven-drying. The surface and/or the accessible pores of the particulate calcium carbonate-comprising material is/are partly or fully coated with the at least one anionic polymer by the foregoing process or contacting step.

One process for the preparation of the surface-coated calcium carbonate-comprising material according to the present invention comprises the following steps:

a') providing at least one surface-reacted calcium carbonate-comprising mineral material and/or a surface-reacted precipitated calcium carbonate, b') providing at least one anionic polymer, c') contacting the at least one surface-reacted calcium carbonate-comprising mineral material and/or surface-reacted precipitated calcium carbonate of step a') and the at least one anionic polymer of step b') for obtaining a surface-coated calcium carbonate-comprising material.

According to one embodiment step c') is performed in an aqueous solution.

According to another embodiment step c') is performed in a dry state. Afterwards the obtained surface-coated calcium carbonate-comprising material is suspended in water to obtain an aqueous slurry.

Alternatively, the at least one anionic polymer may be coated onto said particulate calcium carbonate-comprising material by means of:

i) incipient wetness technique, i.e. impregnating the particulate surface-reacted calcium carbonate-comprising mineral material and/or surface-reacted precipitated calcium carbonate with a solution of the at least one anionic polymer in a suitable mixer (e.g., a fluid bed mixer); or ii) hot melt impregnation technique, i.e. impregnating the particulate surface-reacted calcium carbonate-comprising mineral material and/or surface-reacted precipitated calcium carbonate with a melt of the at least one anionic polymer in a suitable heated mixer (e.g., a fluid bed mixer).

Therefore, in one embodiment the composition comprises:

a) at least one anionic polymer; and
b) a particulate calcium carbonate-comprising material;
   characterized in that the calcium carbonate-comprising material comprises at least one surface-reacted calcium carbonate-comprising mineral material and/or surface-reacted precipitated calcium carbonate; and the at least one anionic polymer being coated onto said particulate calcium carbonate-comprising material by means of:

i) solvent evaporation in a rotational evaporator; or
ii) incipient wetness; or
iii) hot melt impregnation technique.

Incipient wetness impregnation (abbreviated IW or IWI), also called capillary impregnation or dry impregnation, is a commonly used technique to coat an active substance onto and into a porous and/or high surface area solid particulate material.

In the case of coating an anionic polymer onto a powder of porous particles the procedure is as follows:

The polymer is dissolved in an aqueous or organic solution. Then, the polymer containing solution is added to an amount of powder containing the same pore volume as the volume of the solution that was added. Capillary action draws the solution into the pores. The powder should be agitated or shaken to facilitate and accelerate liquid distribution. The powder can then be dried to drive off the volatile components within the solution, preferably under vacuum, depositing the active on the particles inner and outer surface. The concentration profile of the impregnated compound depends on the mass transfer conditions within the pores during impregnation and drying.

Hot melt impregnation is a commonly used technique to coat meltable coating material onto and into a porous and or high surface area solid particulate material. Typically, the powder is heated to a temperature above the melting point of the coating material and then blended with a melt of the coating material in a heated suitable device such as an extruder or a ploughshare mixer, kneader or fluid bed mixer. The amount of molten coating material should be dosed in an amount below the available intra particle pore volume of the involved porous powder if the powdered form should be maintained.

The resulting surface-coated calcium carbonate-comprising material coated with one or more anionic polymers may be obtained in dry form, e.g. as granulate or powder or in liquid form, e.g. as a suspension, preferably an aqueous suspension. In a preferred embodiment the obtained surface-coated calcium carbonate-comprising material is in form of an aqueous suspension and preferably has a solids content in the range of 1 to 80 wt.-%, more preferably 20 to 78 wt.-%, even more preferably 30 to 75 wt.-%, and most preferably 40 to 73 wt.-%, based on the total weight of the slurry.

The resulting surface-coated calcium carbonate-comprising material coated with one or more anionic polymers may be applied according to methods well-known in the art. It may be used in dry form, e.g. as granulate or powder or in liquid form, e.g. as a suspension, preferably an aqueous suspension. In a preferred embodiment the resulting surface-coated calcium carbonate-comprising material is used in form of an aqueous suspension. Preferably, the slurry is diluted with water prior to use to have a solid content in the range from 1 to 80 wt.-%, more preferably 2 to 50 wt.-%, and even more preferably 3 to 20 wt.-%, based on the total weight of the slurry. For example, the aqueous slurry is diluted with water prior to use to adjust a solids content of 5 wt.-% or 10 wt.-%, based on the total weight of the slurry.

According to one embodiment at least 1% of the specific surface area of the surface-reacted calcium carbonate-comprising mineral material and/or surface-reacted precipitated calcium carbonate is covered by the coating comprising at least one anionic polymer. Alternatively, at least 10% of the accessible surface area of the calcium carbonate-comprising material is covered by a coating comprising the at least one anionic polymer. In one embodiment of the present invention, at least 20% of the accessible surface area of the calcium carbonate-comprising material is covered by a coating comprising the at least one anionic polymer, preferably at least 30% of the accessible surface area, more preferably at least 40% of the accessible surface area and most preferably at least 50% of the accessible surface area. For example, at least 75% of the accessible surface area of the calcium carbonate-comprising material is covered by a coating comprising the at least one anionic polymer. For example, at least 90% of the accessible surface area of the calcium carbonate-comprising material is covered by a coating comprising the at least one anionic polymer.

In one embodiment of the present invention, at least 75% of the accessible surface area of the calcium carbonate-comprising material is covered by a coating comprising a homopolymer based on acrylic acid. In another embodiment of the present invention, at least 75% of the accessible surface area of the calcium carbonate-comprising material is covered by a coating comprising a homopolymer based on methacrylic acid.

The Process for the Purification of Water and/or Dewatering of Sludges and/or Suspended Sediments According to the present invention the surface-coated calcium carbonate-comprising material can be used in a process for the purification of water and/or dewatering of sludges and/or suspended sediments.

The process comprises the following steps:
A') providing water to be purified and/or sludge and/or suspended sediment to be dewatered comprising impurities;
B') providing at least one surface-coated calcium carbonate-comprising material, and
C') contacting the water and/or sludge and/or suspended sediment of step A') with the at least one surface-coated calcium carbonate-comprising material of step B') for obtaining a composite material of surface-coated calcium carbonate comprising material and impurities.

According to step A') of the process of the present invention, water to be purified and/or sludge and/or suspended sediment to be dewatered is provided, wherein the water and/or sludge and/or suspended sediment comprises impurities.

The water and/or sludge and/or suspended sediment treated by the process of the present invention is preferably selected from lake water, river water, water reservoirs, canal water, stream water, brooks water, salty water like brackish water, saline water or brine, estuary water, mining runoff water, mining wash water, sludge such as harbour sludge, river sludge, ocean sludge, or coastal sludge, suspended sediments from civil engineering such as drilling muds, shield wall tunnelling, horizontal directional drilling, micro tunnelling, pipe jacking, industrial drilling and mining.

In a preferred embodiment the water is salty water like brackish water, saline water and/or brine.

Salty water according to the present invention refers to any naturally occurring solution that comprises salts. Alternatively the salty water may be prepared synthetically to have the same composition than naturally occurring salty water. The salt in the salty water may primarily be sodium chloride (NaCl) but may also contain other salts. Possible cations in these salts are $K^+$, $Mg^{2+}$, $Sr^{2+}$, $Ca^{2+}$ or $Mn^{2+}$ and possible anions are, for example, $I^-$, $F^-$, $SiO_3^{2-}$, $SO_4^{2-}$, $HCO_3^-$, $Br^-$ or $BO_3^{3-}$. In a preferred embodiment the salt in the salty water comprises sodium chloride. According to another preferred embodiment the salt in the salty water merely consists of sodium chloride. Salty water may be defined or measured by its conductivity and/or its salinity. The salinity of the salty water has to be at least 0.01%. The conductivity of the salty water has to be at least 185 µS/cm.

According to the present invention the "salinity" is defined as the saltiness or dissolved salt content of a body of water. The salinity is expressed in the form of a mass fraction, i.e. the mass of the dissolved material in a unit mass of solution. For example, the amount of 350 g salt per 1 kg of salt water refers to a salinity of 35%. The salinity may be measured with a salinometer. Since the salinity affects the electrical conductivity, the specific gravity and the refractive index of a solution, a salinometer often consist of an ec meter (electrical conductivity meter), a hydrometer, or a refractometer and some means of converting those readings to a salinity reading. According to the present invention the salinity was measured with an ec meter. An ec meter that may be used for measuring the electrical conductivity is SevenMulti from Mettler Toledo. The salinity may be calculated from the measured electrical conductivity.

According to the present invention the "conductivity" or "specific conductance" of the salty water is a measure of its ability to conduct electricity. The conductivity is measured in µS/cm. According to the present invention the electrical conductivity is measured with the SevenMulti from Mettler Toledo according to the measurement method defined in the examples section herebelow.

According to the present invention the salty water may be brackish water, or saline water or brine.

Brackish water is water that has more salinity than fresh water, but not as much as saline water. It may result, for example, from mixing brine or saline water or seawater with fresh water, or it may occur in brackish fossil aquifers. Brackish water is also the primary waste product of the salinity gradient power process. Because brackish water is hostile to the growth of most terrestrial plant species, without appropriate management it is damaging to the environment. Technically, brackish water contains between 0.1 and 30 grams of salt per kg water referring to 0.01 to 3% salinity. Sometimes is expressed as 0.1 to 30 parts per thousand (ppt). Brackish water may have a specific gravity of between 1.005 and 1.010. Thus, brackish water covers a range of salinity regimes. It is characteristic of many brackish surface waters that their salinity can vary considerably over space and/or time.

According to another embodiment of the present invention the brackish water is defined by its conductivity and has an electric conductivity in the range of between 185 µS/cm and less than 41000 µS/cm.

Naturally occurring estuary water may fall within the category of brackish water. "Estuary" is derived from the Latin word aestuarium meaning tidal inlet of the sea. Estuary water is water from a transition zone between river environments (sweet water) and maritime environments (sea water). The estuary water contains more than 0.1 grams of salt per kg water referring to 0.01% salinity but less than naturally occurring salt water or seawater.

Saline water is water that contains a significant concentration of dissolved salts. According to the present invention the salinity of saline water is between 30 g of salt per kg water and 50 g per kg of water referring to 3.0 to 5.0% salinity.

According to another embodiment of the present invention the saline water is defined by its conductivity and has an electric conductivity in the range of between 41000 µS/cm and less than 65000 µS/cm.

Naturally occurring salt water or seawater may fall within the category of saline water. Salt water or sea water is water from a sea or ocean. On average, seawater in the world's oceans has a salinity of about 3.5% (35 g/kg, or 599 mM), which is a specific gravity of about 1.025. The dissolved salts are predominantly sodium ($Na^+$) and chloride ($Cl^+$) ions. The average density at the surface is 1.025 g/ml.

Brine refers to a solution of salt in water. According to the present invention brine refers to salt solutions ranging having a salinity of more than 5%. For example, the salinity may be in the range of 5% to 50%, or in the range of 5% to 35% or in the range of 5% to about 26% which represents a typical saturated solution, depending on temperature.

According to another embodiment of the present invention the brine is defined by its conductivity and has an electric conductivity in the range of between 65000 µS/cm and 350000 µS/cm, or in the range of between 65000 µS/cm and 240000 µS/cm or in the range of between 65000 µS/cm and 150000 µS/cm or in the range of between 65000 µS/cm and 100000 µS/cm. According to a preferred embodiment of the present invention the electric conductivity is in the range between 65000 µS/cm and 80000 µS/cm.

According to the present invention the salty water is brine and preferably has a salinity in the range of 5% to 50%, more preferably in the range of 5% to about 26% even more preferably in the range of 5% to 15% and most preferably in the range of 5% to 10%.

According to another preferred embodiment of the present invention the water and/or sludge and/or suspended sediment of step a) is salty water having a conductivity in the range of between 185 µS/cm and 350000 µS/cm, preferably in the range of between 1000 µS/cm and 300000 µS/cm, more preferably in the range of between 5000 µS/cm and 240000 µS/cm, even more preferably in the range of between 10000 µS/cm and 150000 µS/cm, even more preferably in the range of between 41000 µS/cm and 100000 µS/cm, and most preferably in the range of between 65000 µS/cm and 80000 µS/cm. For example, the salty water has conductivity in the range of between 70000 µS/cm and 75000 µS/cm.

According to another embodiment, the water and/or sludge and/or suspended sediment treated by the process of the present invention is selected from drinking water, urban waste water, municipal waste water, industrial waste water, sludge from biogas production or digested sludge, waste water or process water from breweries or other beverage industries, waste water or process water in the paper industry, colour-, paints-, or coatings industry, agricultural waste water, slaughterhouse waste water, leather industry waste water and leather tanning industry, process water and waste water and sludges from on and offshore oil and/or gas industry.

Within the context of the present invention, the term "process water" refers to any water which is necessary to run or maintain an industrial process. The term "waste water" refers to any water drained from its place of use, e.g. an industrial plant.

The term "sludge" in the meaning of the present invention refers to any kind of sludge, e.g. primary sludge, biological sludge, mixed sludge, digested sludge, physico-chemical sludge and mineral sludge. In this regard, primary sludge comes from the settling process and usually comprises large and/or dense particles. Biological sludge comes from the biological treatment of wastewater and is usually made of a mixture of microorganisms. These microorganisms, mainly bacteria, amalgamate in bacterial flocs through the synthesis of exo-polymers. Mixed sludge is a blend of primary and biological sludges and usually comprises 35 wt.-% to 45 wt.-% of primary sludge and 65 wt.-% to 55 wt.-% of biological sludge. Digested sludge comes from a biological stabilizing step in the process called digestion and is usually performed on biological or mixed sludge. It can be done under different temperatures (mesophilic or thermophilic) and with or without the presence of oxygen (aerobic or anaerobic). Physico-chemical sludge is the result of a physico-chemical treatment of the wastewater and is composed of flocs produced by the chemical treatment. Mineral sludge is given to sludge produced during mineral processes such as quarries or mining beneficiation processes and essentially comprises mineral particles of various sizes.

Within the context of the present invention, the term "sediment" refers to any water containing particles of naturally occurring material.

Preferably, the water and/or sludge and/or suspended sediment to be treated comprises organic impurities and/or inorganic impurities. According to a preferred embodiment the water and/or sludge and/or suspended sediment to be treated comprises cationic organic impurities and/or cationic inorganic impurities.

In accordance with the process of the present invention, the water and/or sludge and/or sediment to be treated comprise inorganic impurities. The term "inorganic impurities" in the meaning of the present invention refers to naturally occurring compounds, wherein their concentration in the water and/or sludge and/or sediment is above the natural concentration typically observed in water and/or compounds that are not naturally occurring.

In particular, many inorganic impurities are typically present as dissolved inorganics, i.e. inorganic substances in solution, such as bicarbonates of calcium and/or magnesium, which give rise carbonate hardness. Other inorganic impurities present in water and/or sludge and/or sediment include carbon dioxide, which dissolves in water to give weakly acidic carbonic acid, sodium salts, silicates leached from sandy river beds, chlorides from saline intrusion, aluminium from dosing chemicals and minerals, phosphates from fertilizers, fluoride compounds derived from additives promoting strong teeth and as discharge from fertilizer and aluminum factories, nitrate and nitrite compounds derived as runoff from fertilizer use as well as leaking from septic tanks, sewage or chlorine derived from the chlorination of the municipal system to combat water-borne diseases and cyanide compounds derived as discharge from steel and metal factories as well as plastic and fertilizer factories.

If the water and/or sludge and/or sediments to be treated comprises heavy metal impurities, which are inorganic impurities, they are typically ferrous and ferric iron compounds derived from minerals and rusty iron pipes; antimony compounds derived as discharge from petroleum refineries, fire retardants or electronics; arsenic compounds derived from erosion of natural deposits, runoff from orchards, runoff from glass and electronics production wastes; barium compounds as discharge of drilling wastes and from metal refineries; beryllium compounds derived as discharge from metal refineries and coal-burning factories as well as electrical, aerospace, and defense industries; cadmium compounds derived from corrosion processes of galvanized pipes, discharge from metal refineries and runoff from waste batteries and paints; chromium compounds derived from discharge from steel and pulp mills; cobalt and nickel compounds derived as discharge from metal refineries and runoff from waste batteries; copper and lead compounds derived from corrosion processes of household plumbing systems; selenium compounds derived as discharge from petroleum refineries and mines such as mines for metal or metal ore extraction or any other mines producing polluted sludge; thallium compounds derived as leaching from ore-processing sites as well as discharge from electronics, glass, and drug factories or zinc, or mercury compounds derived from mining, smelting metals (like zinc, lead and cadmium) and steel production, as well as burning coal and certain wastes can release zinc into the environment. In a preferred embodiment the water to be treated comprises ferrous and ferric iron compounds.

Furthermore, the water and/or sludge and/or suspended sediment to be treated may also comprise organic impurities. In the context of the present invention, the term "organic impurities" has to be interpreted broadly and encompasses specific organic compounds such as surfactants, polycyclic compounds, cholesterol, or endocrine disrupting compounds as well as more complex organic materials (e.g. organic material from microorganisms).

Impurities within the meaning of the present invention shall encompass organic, inorganic, biological, mineral impurities or combinations thereof, wherein said impurities can be present in dissolved, dispersed, or emulsified forms as well as in colloidal form or adsorbed to solids, as well as in combination thereof, or still other forms.

According to one embodiment, the water and/or sludge and/or suspended sediment to be purified includes at least one of the following organic impurities which are selected from the group consisting of surfactants; cholesterol; endocrine disrupting compounds; amino acids; proteins; carbohydrates; defoamers; sizing agents selected from the group consisting of alkyl ketene dimer (AKD), alkenyl succinic anhydride (ASA), or mixtures thereof polyvinylacetates; polyacrylates, in particular polyacrylate latex; styrene butadiene copolymers, in particular styrene butadiene latex; microorganisms; mineral oils; vegetable oils and fats; or any mixture thereof.

In another embodiment of the process of the present invention, the organic impurities also comprise pitch. The term "pitch" as used in the present invention refers to a specific type of organic material generated in the papermaking or pulping process. The primary fibre source in papermaking is wood, which is reduced to its constituent fibres during pulping by combinations of grinding, thermal and chemical treatment. During this process the natural resin contained within the wood is released into the process water in the form of microscopic droplets. These droplets are referred to as pitch. The chemical composition of pitch is generally divided into four classes of lipophilic components: fats and fatty acids; steryl esters and sterols; terpenoids; and waxes. The chemical composition depends on the fibre source, such as variety of tree, and on the seasonal growth from which the sample is produced.

If the organic component is a surfactant, the surfactant can be ionic or non-ionic. Preferably the surfactant is cationic, and its functional group comprises a quaternary ammonium group.

If the water and/or sludge and/or sediment to be treated comprises endocrine disrupting compounds, they are preferably selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17β-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

If the water and/or sludge and/or suspended sediment to be treated comprises defoamers, it can be ethylene oxide glycol ether, a silicone oil based defoamer, a fatty acid ester defoamer, or any mixture thereof. The defoamer may be preferably selected from stickies. Stickies are potentially deposit-forming components originating from recycled paper. In general, examples are glues, hot-melt plastics, printing inks, and latex. The papermaking industry utilizes various amounts of recycled fiber or papers as a source of paper fiber furnish in the production of finished paper products. The recycled papers are often contaminated with the synthetic polymeric materials outlined above and these polymeric materials are referred to as stickies in the papermaking art. Stickies are different from pitch which is a naturally occurring resinous material from the extractive fraction of wood. Reference is made to E. L. Back and L. H. Allen, "Pitch Control, Wood Resin and Deresination", Tappi Press, Atlanta, 2000, wherein stickies are described in further detail.

If the water and/or sludge and/or suspended sediment to be treated comprises microorganisms, they are preferably selected from bacteria, fungi, archaea or protists.

If the water and/or sludge and/or suspended sediment to be treated comprises mineral oils, they are preferably selected from crude oil or from gasoline residues or spillages.

Preferred vegetable oils are edible oils such as coconut oil, corn oil, cottonseed oil, canola oil, palm oil, soybean oil, sunflower oil, or linseed oil.

The exact composition of the water and/or sludge and/or sediment to be purified and especially the amount of inorganic and/or organic impurities varies depending on the origin of the polluted water and/or sludge and/or sediment.

In a preferred embodiment the water and/or sludge and/or suspended sediment to be treated comprises inorganic and/or organic impurities, preferably cationic inorganic and/or organic impurities. According to one embodiment the water and/or sludge and/or suspended sediment to be treated comprises one cationic inorganic impurity.

According to a preferred embodiment the dissolved cationic inorganic impurities may be precipitated by pH adjustment prior or in the presence of the at least one surface-coated calcium carbonate-comprising material of step B').

According to step B') the at least one surface-coated calcium carbonate-comprising material is provided.

The at least one surface-coated calcium carbonate-comprising material to be used in the inventive process can be present in any appropriate form, e.g. in the form of granules and/or a powder, in the form of a cake or in the form of a slurry. According to one embodiment, the surface-coated calcium carbonate-comprising material to be used in the inventive process is in powder form and/or in the form of granules. In one embodiment of the present invention, the surface-coated calcium carbonate-comprising material to be used in the inventive process is in powder form. In a preferred embodiment, the surface-coated calcium carbonate-comprising material to be used in the inventive process can be present as an aqueous suspension, e.g. in the form of a slurry or a paste which can be metered with a conveying screw.

A "slurry" or "suspension" in the meaning of the present invention comprises undissolved solids, i.e. surface-coated calcium carbonate-comprising material and water and optionally further additives. Suspensions usually contain large amounts of solids and are more viscous and generally of higher density than the liquid from which they are formed. It is accepted in the art that the general term "dispersion" inter alia covers "suspensions" or "slurries" as a specific type of dispersion.

In one embodiment of the present invention, the at least one surface-coated calcium carbonate-comprising material to be used in the inventive process is in liquid form, e.g. a suspension, preferably an aqueous suspension. According to one embodiment the surface-coated calcium carbonate-comprising material is in form of an aqueous suspension and preferably has a solids content in the range of 1 to 80 wt.-%, more preferably 20 to 78 wt.-%, even more preferably 30 to 75 wt.-%, and most preferably 40 to 73 wt.-%, based on the total weight of the slurry.

According to a preferred embodiment of the present invention the slurry comprising the surface-coated calcium carbonate-comprising material coated with one or more anionic polymers may be diluted with water prior to use to have a solid content in the range from 1 to 80 wt.-%, more preferably 2 to 50 wt.-%, and even more preferably 3 to 20 wt.-%, based on the total weight of the slurry. For example, the aqueous slurry is diluted with water prior to use to have a solids content of 5 wt.-% or 10 wt.-%, based on the total weight of the slurry.

As said out above the "slurry" or "suspension" comprising the surface-coated calcium carbonate-comprising material and water may optionally comprise further additives like surfactants, defoamers, diluents, solvents, compatibility agents, thickeners, drift control agents, dyes, fragrance, and chelating agents.

According to step C') of the process of the present invention, the water to be purified and/or sludge and/or suspended sediment to be dewatered provided in step A') is contacted with the at least one surface-coated calcium carbonate-comprising material of step B') for obtaining a composite material of surface-coated calcium carbonate-comprising materials and impurities from different sources.

In general, the water to be purified and/or sludge and/or suspended sediment to be dewatered and the surface-coated calcium carbonate-comprising material can be brought into contact by any conventional means known to the skilled person.

For example, the step of contacting the water to be purified and/or sludge and/or suspended sediment to be dewatered with the at least one surface-coated calcium carbonate-comprising material preferably takes place in that the surface of the polluted water and/or sludge and/or suspended sediment is at least partially covered with the at least one surface-coated calcium carbonate-comprising material. Additionally or alternatively, the step of contacting the water to be purified and/or sludge and/or suspended sediment to be dewatered with the at least one surface-coated calcium carbonate-comprising material preferably takes place in that the polluted water and/or sludge and/or suspended sediment of step A') is mixed with the surface-coated calcium carbonate-comprising material of step B'). The skilled man will adapt the mixing conditions (such as the configuration of mixing speed) according to his needs and available equipment.

Preferably, the surface-coated calcium carbonate-comprising material is suspended in the water and/or sludge and/or suspended sediment to be treated, e.g. by agitation means.

The treatment time for carrying out the contacting of the water to be purified and/or sludge and/or suspended sediment to be dewatered with the at least one surface-coated calcium carbonate-comprising material is carried out for a period in the range of several seconds to several minutes, e.g. 20 s or more, preferably 30 s or more, more preferably 60 s or more and most preferably for a period of 120 s or more. The treatment time for carrying out the contacting can also be carried out for a period of 3 min or more, 4 min or more, 5 min or more, 10 min or more, 20 min or more or 30 min or more.

The contacting may be carried out under stirring or mixing conditions. Any suitable mixer or stirrer known to the skilled person may be used. The mixing or stirring may be performed at a rotational speed of 10 rpm to 20000 rpm. In a preferred embodiment the mixing or stirring is performed at a rotational speed of 10 rpm to 1500 rpm, for example, at a rotational speed of 100 rpm, or 200 rpm, or 300 rpm, or 400 rpm, or 500 rpm, or 600 rpm, or 700 rpm, or 800 rpm, or 900 rpm, or 1000 rpm.

According to an preferred embodiment the contacting of the water to be purified and/or sludge and/or suspended sediment to be dewatered with the at least one surface-coated calcium carbonate-comprising material is carried out for a period in the range of 60 s to 180 s under mixing conditions at a rotational speed of 100 rpm to 1000 rpm. For example the contacting is carried out for 120 s at a rotational speed of 300 rpm.

In general, the length and the rotational speed of contacting the water and/or sludge and/or suspended sediment to be treated with the at least one surface-coated calcium carbonate-comprising material is determined by the degree of water and/or sludge and/or suspended sediment pollution and the specific water and/or sludge and/or suspended sediment to be treated.

It is to be understood that the amount of surface-coated calcium carbonate-comprising material according to the present process is selected such that it is sufficient in the water and/or sludge and/or suspended sediment to be treated, i.e. high enough for providing efficient binding activity for at least one type of impurities present in the polluted water and/or sludge and/or suspended sediment but at the same time is so low that no significant amount of unbound surface-coated calcium carbonate-comprising material would be observed in the effluent released from the treatment of the water and/or sludge and/or suspended sediment.

The amount of surface-coated calcium carbonate-comprising material depends on the type of water and/or sludge and/or suspended sediment to be treated as well as on the type and amount of impurities. Preferably, an amount of 10 ppm to 1 wt.-% surface-coated calcium carbonate-comprising material, based on the total weight of the water and/or sludge and/or sediment to be treated, is added. For example, an amount of 10 ppm to 500 ppm, preferably of 10 ppm to 100 ppm surface-coated calcium carbonate-comprising material, based on the total weight of the wastewater to be treated, is added. The amount of 1 ppm according to the present invention corresponds with an amount of 1 mg surface-coated calcium carbonate-comprising material per 1 liter of water to be treated. According to another example, an amount of 100 ppm to 3000 ppm, preferably of 200 ppm to 2000 ppm surface-coated calcium carbonate-comprising material, based on the total weight of the sludge and/or suspended sediment to be treated, is added. In a preferred embodiment the sludge and/or suspended sediment has a solid content of 5 to 10 wt.-%, based on the total weight of the sludge and/or sediment.

According to one embodiment the surface-coated calcium carbonate-comprising material is used in a weight ratio of from 1:20000 to 1:30, preferably from 1:10000 to 1:35, more preferably from 1:1000 to 1:40 and most preferably from 1:850 to 1:45 on a dry weight basis relative to the weight of the dry impurities and/or sludge and/or sediment.

The surface-coated calcium carbonate-comprising material can be added as an aqueous suspension, e.g. the suspensions described above. Alternatively, it can be added to the water to be purified and/or sludge and/or suspended sediment to be dewatered in any appropriate solid form, e.g. in the form of granules or a powder or in form of a cake.

Within the context of the present invention, it is also possible to provide an immobile phase, e.g. in the form of a cake or layer, comprising the surface-coated calcium carbonate-comprising material, the water and/or sludge and/or suspended sediment to be treated running through said immobile phase.

In a preferred embodiment, the water and/or sludge and/or suspended sediment to be purified is passed through a permeable filter comprising the surface-coated calcium carbonate-comprising material and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising a number of tortuous passages of varying diameter and configuration retains impurities by molecular and/or electrical forces adsorbing the impurities onto the surface-coated calcium carbonate-comprising material which is present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

In one preferred embodiment of the present invention, the process further comprises step D') of contacting the water to be purified and/or sludge and/or suspended sediment to be dewatered with at least one flocculation aid selected from polymeric and/or non-polymeric flocculation aids.

In a preferred embodiment of the present invention, the flocculation aid and the surface-coated calcium carbonate-comprising material are added simultaneously to the water and/or sludge and/or suspended sediment to be treated. In another preferred embodiment of the present invention, the flocculation aid and the surface-coated calcium carbonate-comprising material are added separately to the water and/or sludge and/or suspended sediment to be treated. In this case, the water and/or sludge and/or suspended sediment to be treated is first contacted with the surface-coated calcium carbonate-comprising material and then with the flocculation aid.

For example, the flocculation aid is added to the water and/or sludge and/or suspended sediment to be treated when adsorption of impurities on the surface-coated calcium carbonate-comprising material has reached its maximum, i.e. there is no further decrease of impurities within the water. However, it is also possible to add the flocculation aid at an earlier stage, e.g. when at least 50%, at least 70% or at least 90% of maximum adsorption of impurities on the surface-coated calcium carbonate-comprising mineral material has been reached.

The step of contacting the water to be purified and/or sludge and/or suspended sediment to be dewatered with the at least one surface-coated calcium carbonate-comprising material and the flocculation aid preferably takes place in that the surface of the water and/or sludge and/or suspended sediment is at least partially covered, either simultaneously or separately, with the at least one surface-coated calcium carbonate-comprising material and the flocculation aid. Additionally or alternatively, the step of contacting the water to be purified and/or sludge and/or suspended sediment to be dewatered with the at least one surface-coated calcium carbonate-comprising material and the flocculation aid preferably takes place in that the water and/or sludge and/or suspended sediment is, either simultaneously or separately, mixed with the surface-coated calcium carbonate-comprising material and the flocculation aid. The skilled man will adapt the mixing conditions (such as the configuration of mixing speed) according to his needs and available equipment.

The treatment time for carrying out the contacting of the water to be purified and/or sludge and/or suspended sediment to be dewatered with the at least one surface-coated calcium carbonate-comprising material and the flocculation aid is carried out for a period in the range of several seconds to several minutes, e.g. 30 s or more, preferably 60 s or more, more preferably 90 s or more and most preferably for a period of 180 s or more. In general, the length of contacting the water and/or sludge and/or suspended sediment to be treated with the at least one surface-coated calcium carbonate-comprising material and the flocculation aid is determined by the degree of water pollution and the specific water and/or sludge and/or suspended sediment to be treated.

In a preferred embodiment of the present invention, process step C') and step D') are repeated one or more times. In a preferred embodiment of the present invention, process step C') or step D') is repeated one or more times. If step C') and step D') are repeated one or more times, step C') and step D') may be repeated independently, i.e. step C') may be repeated several times, while step D') is repeated more or less times than step c) and vice versa. For example, step C') may be repeated twice, while step D') is repeated once or more than twice.

According to one embodiment the flocculation aid is a polymeric flocculation aid. The polymeric flocculation aid can be non-ionic or ionic and preferably is a cationic or anionic polymeric flocculation aid. Any polymeric flocculation aid known in the art can be used in the process of the present invention. Examples of polymeric flocculation aids are disclosed in WO 2013/064492. Alternatively, the polymeric flocculation aid may be a polymer as described as comb polymer in US 2009/0270543 A1.

In a preferred embodiment the polymeric flocculation aid is a cationic or anionic polymer selected from polyacrylamides, polyacrylates, poly(diallyldimethylammonium chloride), polyethyleneimines, polyamines or mixtures of these, and natural polymers such as starch, or natural modified polymers like modified carbohydrates.

Preferably, the polymeric flocculation aid has a weight average molecular weight of at least 100000 g/mole. In a preferred embodiment, the polymeric flocculation aid has a weight average molecular weight Mw in the range from 100000 to 10000000 g/mole, preferably in the range from 300000 to 5000000 g/mole, more preferably in the range from 300000 to 1000000 g/mole and most preferably in the range from 300000 to 800000 g/mole.

According to another embodiment the flocculation aid is a non-polymeric flocculation aid. The non-polymeric flocculation aid may be a cationic flocculating agent comprising a salt of a fatty acid aminoalkyl alkanolamide of the following general structure:

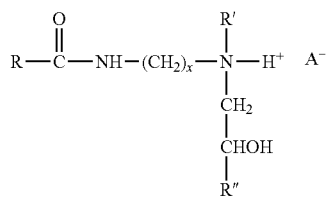

wherein R is a carbon chain of a fatty acid having from 14 to 22 carbon atoms, R' is H, or C1 to C6 alkyl group, R" is H, or $CH_3$, x is an integer of 1-6, and A is an anion. Examples of such non-polymeric flocculation aids are disclosed in U.S. Pat. No. 4,631,132.

According to a preferred embodiment of the present invention the flocculation aid is a non-polymeric flocculation aid selected from inorganic flocculation aids, for example selected from aluminium sulphate ($Al_2(SO_4)_3$), iron chloride ($FeCl_3$) and powder activated carbon (PAC). Such flocculation aids are known by the skilled person and are commercially available.

According to another embodiment of the present invention an additional flocculation aid is used in the process for purification of water and/or dewatering of sludges and/or suspended sediments.

Optionally, further additives can be added to the water and/or sludge and/or suspended sediment to be treated. These might include, for example, agents for pH adjustment or phyllosilicates.

The at least one phyllosilicate is preferably bentonite. Accordingly, the at least one phyllosilicate preferably comprises bentonite, more preferably consists of bentonite.

If the at least one phyllosilicate comprises, preferably consists of, bentonite the bentonite is preferably selected from sodium bentonite, calcium bentonite, potassium bentonite and mixtures thereof.

It is appreciated that the bentonite is preferably a natural material and thus its precise composition, the number of its constituents and the amount of the single constituents may vary in a broad range usually depending on the source of origin.

For example, the bentonite usually comprises, preferably consists of, various clay minerals such as in particular montmorillonite as the main component, but also quartz, kaolinite, mica, feldspar, pyrite, calcite, cristobalite and mixtures thereof as concomitant minerals. These minerals may be present in variable amounts, as well as other components, depending on the site of origin. Phyllosilicates than can be used in the inventive process are disclosed in WO 2014/180631.

After the contacting/flocculation has been completed, the flocculated composite material can be removed from the treated water by conventional separation means known to the skilled person such as filtration, sedimentation and/or centrifugation.

In accordance with the present invention, the process for the purification of water and/or dewatering of sludge and/or suspended sediments is suitable for effectively reducing the amount of the anionic polymer contained in the purified water sample and/or dewatered sludge and/or suspended sediment sample.

The use of the inventive process for the purification of water and/or dewatering of sludges and/or suspended sediments provides a number of improved properties. First of all, the inventive process provides excellent binding activity for impurities when the at least one surface-coated calcium carbonate-comprising material is at least partially applied onto the surface of the water and/or sludge and/or sediment to be treated or mixed with the water and/or sludge and/or suspended sediment to be treated. Furthermore, the use of the inventive water treatment process results in a composite material of surface-coated calcium carbonate-comprising materials and impurities which can be easily removed from the medium to be treated. Furthermore, the binding of impurities by the inventive process results in a good cleansing quality of the effluent released from the treatment of the water and/or sludge and/or suspended sediment as well as of the obtained filter cake. In this context a good and fast settlement of the flocs is reached which leads to shorter filtration periods and reduced treatment costs. The filtration of the sludge is facilitated by the addition of the inventive surface-coated calcium carbonate-comprising material leading to shorter filtration periods and, therefore, to reduced treatment costs. A further advantage of the inventive process resides in the fact that the used surface-coated calcium carbonate-comprising material lowers the amount of anionic polymeric flocculation aid in the treated water and/or sludge and/or sediment and thus decreases the disturbance of the ecological balance. Another advantage of the inventive process is that the quality of the obtained filter cake is increased so that the subsequent disposal is less energy-consuming.

Another advantage of the inventive surface-coated calcium carbonate-comprising material is that cationic contaminants and impurities can preferentially be bound to the surface-coated calcium carbonate-comprising material. Still another advantage of the present invention is that the inventive surface-coated calcium carbonate-comprising material can be used in a process for purification of water and/or dewatering of sludges and/or suspended sediments that are obtained from salty water like brackish water and/or saline water and/or brine.

According to a further aspect of the present invention, a composite material comprising the surface-coated calcium carbonate-comprising material and impurities is provided. The composite material may further comprises a flocculation aid or a phyllosilicate as defined above.

If the flocculated composite material is separated from the water and/or sludge and/or suspended sediment by filtration, sedimentation and/or centrifugation, the composite material can be present in the form of a filter cake.

With regard to the definition of the surface-coated calcium carbonate-comprising material and preferred embodiments thereof, reference is made to the statements provided above when discussing the technical details of the surface-coated calcium carbonate-comprising material and the processes of the present invention.

In the following especially preferred combinations of the surface-coated calcium carbonate-comprising material and the inventive processes are disclosed.

According to a preferred embodiment the surface-coated calcium carbonate-comprising material is characterized in that the calcium carbonate comprises at least one surface-reacted calcium carbonate-comprising mineral material and at least one anionic polymer.

In a preferred embodiment the calcium carbonate-comprising mineral material is a ground calcium carbonate-comprising mineral material (GCC) and preferably is marble.

The surface-reacted calcium carbonate-comprising mineral material is preferably obtained by suspending the calcium carbonate-comprising mineral material in water to obtain a slurry having a solids content in the range of 5 to 40 wt.-% and adding at least one water soluble free acid to the slurry. Preferably the at least one water soluble free acid is a medium strong acid having a pKa value from 0 to 2.5 at 20° C. and, more preferably is $H_3PO_4$. According to this embodiment the carbon dioxide is formed in situ by the acid treatment.

According to another preferred embodiment the acid treatment may be performed in the presence at least one compound selected from the group consisting of silicate, for example sodium silicate, magnesium oxide, citric acid, aluminium sulfate, aluminium nitrate, aluminium chloride, and mixtures thereof and preferably the acid treatment may be performed in the presence of sodium silicate.

According to one embodiment of the present invention the surface-reacted calcium carbonate-comprising material has a volume median particle diameter $d_{50}$ between 1 μm and 100 μm and/or a specific surface-area between 30 and 100 m²/g.

According to another preferred embodiment the at least one anionic polymer is a polyacrylate and more preferably sodium polyacrylate. The sodium polyacrylate may have a charge density in the range of 1000 μEq/g (negative charge) to 10000 μEq/g (negative charge), preferably in the range of 2000 μEq/g (negative charge) to 8000 μEq/g (negative charge). For example, the sodium polyacrylate has a charge density in the range of 2000 μEq/g (negative charge) to 3500 μEq/g (negative charge) or in the range of 7000 μEq/g (negative charge) to 8000 μEq/g (negative charge).

According to one embodiment the surface-coated calcium carbonate-comprising material is characterized in that the calcium carbonate comprises a surface-reacted calcium carbonate-comprising mineral material which is a ground calcium carbonate that has been acid treated with $H_3PO_4$ preferably in the presence of sodium silicate and wherein the coating comprising the at least one anionic polymer that comprises, preferably consists of polyacrylate. In a more preferred embodiment the polyacrylate is a sodium polyacrylate and in a even more preferred embodiment the anionic polymer is present on the calcium-carbonate comprising mineral material in an amount of 0.5 to 5 wt.-% and preferably in an amount of 1.2 wt.-% to 2.5 wt.-%, based on the dry weight of the calcium carbonate comprising mineral material.

The surface-coated calcium carbonate-comprising material may additionally comprise dolomite.

Preferably, these surface-coated calcium carbonate-comprising materials are used in the process for the purification of water and/or dewatering of sludges and/or suspended sediments.

According to a preferred embodiment the water to be purified and/or sludge and/or suspended sediment to be dewatered according to the inventive process is salty water, preferably selected from brackish water, saline water or brine. According to a preferred embodiment the salty water is brine and preferably has a salinity in the range of 5% to 50%, preferably in the range of 5% to 35%, more preferably in the range of 5% to about 26% even more preferably in the range of 5% to 15%, and most preferably in the range of 5% to 10%.

According to another preferred embodiment the water to be purified and/or sludge and/or suspended sediment to be dewatered according to the inventive process is salty water, preferably selected from brackish water, saline water or brine. According to a preferred embodiment the salty water has a conductivity in the range of between 185 μS/cm and 350000 μS/cm, preferably in the range of between 1000 μS/cm and 300000 μS/cm, more preferably in the range of between 5000 μS/cm and 240000 μS/cm, even more preferably in the range of between 10000 μS/cm and 150000 μS/cm, even more preferably in the range of between 41000 μS/cm and 100000 μS/cm, and most preferably in the range of between 65000 μS/cm and 80000 μS/cm. For example, the salty water has conductivity in the range of between 70000 μS/cm and 75000 μS/cm.

Preferably, the surface-coated calcium carbonate-comprising material is used in addition to a flocculation aid, preferably a non-ionic flocculation aid, even more preferably a non-ionic inorganic flocculation aid.

According to the present invention the surface-coated calcium carbonate-comprising material is used for water purification and/or dewatering of sludges and/or suspended sediments and especially is used for water purification and/or dewatering of sludges and/or suspended sediments wherein the water is salty water like brackish water or saline water or brine and more preferably has a salinity of in the range of 5% to 50%, preferably in the range of 5% to 35%, more preferably in the range of 5% to about 26% even more preferably in the range of 5% to 15%, and most preferably in the range of 5% to 10%. According to another preferred embodiment the surface-coated calcium carbonate-comprising material is used for water purification and/or dewatering of sludges and/or suspended sediments and especially is used for water purification and/or dewatering of sludges and/or suspended sediments wherein the water is salty water like brackish water or saline water or brine and more preferably has a conductivity in the range of between 185 μS/cm and 350000 μS/cm, preferably in the range of between 1000 μS/cm and 300000 μS/cm, more preferably in the range of between 5000 μS/cm and 240000 μS/cm, even more preferably in the range of between 10000 μS/cm and 150000 μS/cm, even more preferably in the range of between 41000 μS/cm and 100000 μS/cm, and most preferably in the range of between 65000 μS/cm and 80000

μS/cm. For example, the salty water has conductivity in the range of between 70000 μS/cm and 75000 μS/cm.

EXAMPLES

The scope and interest of the invention may be better understood on the basis of the following examples which are intended to illustrate embodiments of the present invention. However, they are not to be construed to limit the scope of the claims in any manner whatsoever.

Measurement Processes

The following measurement processes were used to evaluate the parameters given in the examples and claims.

Particle Size Distribution (Mass % Particles with a Diameter<X) and Weight Median Diameter ($d_{50}$) of a Particulate Material Weight median grain diameter and grain diameter mass distribution of a particulate material were determined via the sedimentation process, i.e. an analysis of sedimentation behavior in a gravitational field. The measurement was made with a Sedigraph™ 5100.

The volume-based median particle diameter of the surface-reacted calcium carbonate-comprising mineral material and/or the surface-reacted precipitated calcium carbonate was determined by using a Malvern Mastersizer 2000.

The processes and instruments are known to the skilled person and are commonly used to determine grain size of fillers and pigments. The measurements were carried out in an aqueous solution of 0.1 wt.-% $Na_4P_2O_7$. The samples were dispersed using a high speed stirrer and ultrasound.

BET Specific Surface Area of a Material

The BET specific surface area was measured via the BET process according to ISO 9277 using nitrogen, following conditioning of the sample by heating at 250° C. for a period of 30 minutes. Prior to such measurements, the sample was filtered, rinsed and dried at 110° C. in an oven for at least 12 hours.

pH Measurement

The pH of the water samples is measured by using a standard pH-meter at approximately 25° C.

Conductivity Measurement

The conductivity of salty water is measured at 25° C. using Mettler Toledo Seven Multi instrumentation equipped with the corresponding Mettler Toledo conductivity expansion unit and a Mettler Toledo InLab® 741 conductivity probe.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

The salinity of the salty water is measured with the same equipment under the same conditions and converted into ppt (parts per thousand) or % as defined above.

Charge Density

The charge density of a polymer and of a surface-coated calcium carbonate-comprising material was measured with a particle charge detector (PCD). The used particle charge detector was either a PCD-03 or a PCD-05, both available from Mütek with a measuring cell type 1 (10 to 30 ml).

The measurement of the charge density of a sample was carried out by weighting the sample in the cell as well as 10.0 g of demineralized water. The electrodes inside the cell have to be covered with liquid.

The piston was slowly inserted in the measuring cell and the measurement was started.

The samples were titrated with a 2.5 mmol/l polyvinylsulfate potassium solution. The solution was prepared by weighting 0.234 g polyvinylsulfate potassium salt in a volumetric flask (500 ml) and dissolving it with approximately 250 ml deionized water. 500 μl formaldehyde solution 37% and 100 μl benzylalcohol 99% were added and the solution was filled up to 500 ml with deionized water.

The titration solution factor (f) for the 2.5 mmol/l polyvinylsulfate potassium solution was determined by titrating 10.0 g demineralized water with 1000 ml poly-DADMAC 2.5 mmol/l solution. The factor f was calculated by the following equitation:

factor (f)=volume theoretical (ml)/volume used (ml)

The charge density of the titrated sample was calculated by the following equation:

charge density=titrant consumption (ml)*2.5 (μmol/ml)*factor f/sample weight of the dry sample (g)

TOC (Total Organic Content) Content Measurement

The TOC was measured using the TOC cuvette test from Hach-Lange depending of the TOC range (TOC cuvette test LCK 385 for 3-30 mg/L TOC, LCK 386 for 30-300 mg/L TOC). The samples were prepared as indicated in the operating instructions of the cuvettes. The cuvettes were measured with a spectrophotometer Hach Lange DR2800.

Weight Solids (% by Weight) or Solids Content of a Material in Suspension

The weight of solids is determined by dividing the weight of the solid material by the total weight of the aqueous suspension. The "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Example 1—Preparation of the Surface-Reacted Calcium Carbonate-Comprising Mineral Material (SRCC1)

In a mixing vessel, 1900 liters of an aqueous suspension of ground calcium carbonate was prepared by adjusting the solids content of a ground marble calcium carbonate from Omya Inc. Vermont, USA having a weight based median particle size of 0.7 μm, as determined by sedimentation, such that a solids content of 20 wt.-%, based on the total weight of the aqueous suspension, was obtained.

Whilst rapidly mixing the suspension, 145 kg phosphoric acid in form of an aqueous solution containing 30 wt.-% phosphoric acid, based on the total weight of the aqueous solution, was added to said suspension over a period of 10 minutes at a temperature of 70° C. Simultaneous to the addition of phosphoric acid, 303 kg of sodium silicate in the form of an aqueous solution containing 5 wt.-% sodium silicate was added to said suspension over a period of 10 minutes. After the addition of the acid, the slurry was stirred for additional 5 minutes, before removing it from the vessel and drying. During acid treatment, carbon dioxide was formed in situ in the aqueous suspension.

The resulting surface-reacted calcium carbonate-comprising mineral material SRCC1 had a volume median grain diameter ($d_{50}$) of 2.3 μm and a $d_{98}$ of 5.5 μm as measured by laser diffraction and a specific surface area of 38 $m^2/g$.

Example 2—Preparation of the Surface-Coated Calcium Carbonate-Comprising Mineral Material (SCCC1)

The surface-coated calcium carbonate-comprising material (SRCC1) was coated with an anionic polymer.

The used anionic polymer was a sodium polyacrylate available from Coatex Arkema Group A slurry of the obtained surface-reacted calcium carbonate-comprising mineral material SRCC1 having a solids content of 61 wt.-% was provided. The surface-reacted calcium carbonate-comprising mineral material was coated with 1.2 wt.-% of the anionic polymer, based on the total weight of the surface-reacted calcium carbonate-comprising mineral material. The obtained slurry of the surface-coated calcium carbonate-comprising material was diluted with water to a solids content of 10 wt.-%, based on the total weight of the aqueous slurry. The obtained slurry was vigorously agitated to obtain a homogenous slurry and to avoid settling. The charge of the surface-coated calcium carbonate-comprising material SCCC1 is 61.5 µEq/g (negative charge).

Example 3—Application Trials with the Surface-Coated Calcium Carbonate-Comprising Material (SCCC1)

The waste water that has been treated was obtained from a mining containing 2000 ppm of dissolved iron. The waste water was vigorously agitated and the pH of the waste water was adjusted to pH 10 with NaOH solution.

Different dosages of 10, 20, 30, 40 and 50 ppm (vol/vol) of the surface-coated calcium carbonate comprising material (SCCC1) in form of the above described slurry were added simultaneously to the waste water samples. The samples were agitated for a 2 minutes using a standard jar test equipment. After mixing, the flocculation of the iron hydroxide flocs and the surface-coated calcium carbonate comprising material was observed.

In all samples sedimentation could be observed and a clear supernatant was obtained. The iron content of the obtained supernatant was measured with an iron cuvette test from Hach-Lange with photometric detection from Hach Lange DR2800 and was below 0.15 ppm in all samples. This data shows that waste water treatment with the inventive surface-coated calcium carbonate-comprising material is possible, especially the treatment of waste water comprising cationic impurities. With the inventive surface-coated calcium carbonate-comprising material it is possible to reduce the amount of cationic impurities, especially cationic inorganic impurities to nearly zero in the treated waste water samples.

Example 4—Preparation of the Surface-Reacted Calcium Carbonate-Comprising Material (SRCC2)

The feed used for preparing the surface-reacted calcium carbonate comprising mineral material was an aqueous suspension of ground calcium carbonate from Omya Hustadmarmor, Norway, having a weight median grain diameter $d_{50}$ of 8 µm and a solids content of 40 wt.-%, based on the total weight of the aqueous suspension.

The feed was ground in a DynoMill MultiLab (W. Bachofen AG) using Verac grinding media with a diameter of 0.7-1.4 mm in form of an aqueous suspension in order to obtain a finer calcium carbonate. The obtained aqueous suspension had a weight median grain diameter $d_{50}$ of 1 µm and a solids content of 18 wt.-%, based on the total weight of the aqueous suspension.

The obtained ground feed suspension was placed in a mixing vessel and while rapidly mixing the suspension, phosphoric acid was added to that suspension in an amount of 9 to 12 wt.-% of active phosphoric acid, based on the dry weight of the ground calcium carbonate. After the addition of the acid, the slurry was stirred for additional 5 minutes, before removing it from the vessel, dewatering it mechanically and drying the resulting filter cake. During acid treatment, carbon dioxide was formed in situ in the aqueous suspension.

The resulting surface-reacted calcium carbonate-comprising mineral material SRCC2 was in the form of a dry powder and had a volume median grain diameter ($d_{50}$) of 5.25 µm and a $d_{98}$ of 16 µm as measured by laser diffraction and a specific surface area of 39.3 m²/g.

Example 5—Preparation of the Surface-Coated Calcium Carbonate-Comprising Material (SCCC2)

The surface-coated calcium carbonate-comprising mineral material (SRCC2) was coated with an anionic polymer.

The used anionic polymer was an anionic sodium polyacrylate polymer, commercially sold under the brandname Nerolan AG 580, which is commercially available from Nerolan Wassertechnik GmbH, Germany. The sodium polyacrylate polymer had a charge density of 7840 µEq/g (negative charge).

The obtained surface-reacted calcium carbonate-comprising material SRCC2 consists of a dry powder that was coated with the anionic polymer by mixing the dry SRCC2 with the dry anionic polymer in an amount of 2 wt.-%, based on the total weight of the surface-reacted calcium carbonate-comprising mineral material. Afterwards the surface-coated calcium carbonate comprising material (SCCC2) was mixed with water in order to obtain a homogenous slurry at a solids content of 10 wt.-%, based on the total weight of the aqueous suspension. The charge density of the surface-coated calcium carbonate-comprising material SCCC2 was 65.7 µEq/g (negative charge). The obtained slurry was vigorously agitated to obtain a homogenous slurry and to avoid settling.

Example 6—Application Trials with the Surface-Coated Calcium Carbonate-Comprising Material (SCCC2)

The waste water that has been treated was a brine water sample (for the composition of the brine water sample see table 1) from the regeneration of a sorption media (resin) in an ion exchange (IC) water treatment process. That IC brine waste concentrate contains organic impurities in an amount of 992 mg/l TOC. TOC is the total organic carbon in the sample. The conductivity of the brine water sample was 70.4 mS/cm.

TABLE 1

|  | max. | min. | avg. |
|---|---|---|---|
| $NO_3$ (mg/l) | 391 | 228 | 302 |
| $PO_4$ (mg/l) | 9.5 | 1.3 | 3.9 |
| Na (g/l) | 18 | 10 | 15 |
| Ca (mg/l) | 30.5 | 14.6 | 25.9 |
| Mg (g/l) | 0.07 | 0.07 | 0.07 |
| K (g/l) | 0.07 | 0.07 | 0.07 |
| Cl (g/l) | 20 | 10 | 14 |

TABLE 1-continued

|  | max. | min. | avg. |
|---|---|---|---|
| $HCO_3$ (g/l) | 41.3 | 4.7 | 10.2 |
| $CO_3$ (g/l) | 1.6 | 1.6 | 1.6 |
| $SO_4$ (g/l) | 12.7 | 7.1 | 10 |

Different dosages of the surface-coated calcium carbonate comprising material (SCCC2) in form of the above described slurry were added to the waste water samples together with different non-polymeric flocculation aids. The used flocculation aids were aluminium sulphate ($Al_2(SO_4)_3$) available from Sigma Aldrich, iron chloride ($FeCl_3$) available from Sigma Aldrich and powder activated carbon (PAC) available from Norit AC under the brand name SAE Super 8008.3. The samples were agitated for 2 minutes with a magnetic stirrer. After mixing, flocculation was observed combined with significant colour removal from the supernatant.

In all samples sedimentation could be observed and a relative clear supernatant was obtained. The total organic content (TOC) of the obtained supernatant was measured.

TABLE 2

| Sample number | 6.1 | 6.2 | 6.3 | 6.4 |
|---|---|---|---|---|
| SCCC2 | − | + | + | + |
| Flocculation aid | − | $Al_2(SO_4)_3$ | $FeCl_3$ | PAC |
| Sample dosage (g) | 50 | 30 | 15 | 50 |
| Flocculation aid dosage | − | 12 ml (5 wt.-% solution) | 15 ml (5 wt.-% solution) | 2 g |
| Flocculation dosage | − | 18 ml (10 wt.-% slurry) | 15 ml (10 wt.-% slurry) | 2 ml (10 wt.-% slurry) |
| TOC (mg/l) | 992 | 256 | 618 | 315 |
| Color of supernatant | Red brown | yellowish | clear | Slightly yellowish |

This data shows that waste water treatment of salty water, namely brine, is possible with the inventive surface-coated calcium carbonate comprising material. Furthermore, it is possible to use an additionally flocculation aid, for example an inorganic flocculation aid, in combination with the inventive surface-coated calcium carbonate comprising material. The use of such a flocculation aid alone in said brine does not provide an appropriate settling of the sludge. By the combination of the surface-coated calcium carbonate comprising material and the additionally flocculation aid it is possible to drastically reduce the amount of organic impurities in the obtained supernatant and to reach a significant colour removal in the obtained supernatant.

Example 7—Application Trials with the Surface-Coated Calcium Carbonate Comprising Material (SCCC2)

The sludge that has been treated was a polishing sludge from limestone plates having a solids content of 81.7%. The sludge comprises 96.0% $CaCO_3$, 1.6% $MgCO_3$ and 1.5% $SiO_2$. The sludge has been diluted to a solid content of 10 wt.-% based on the total solids amount in the sludge. The sludge sample was vigorously agitated to obtain a homogeneous sludge suspension and to avoid settling of the sludge sample.

Different dosages of 0 $kg_{dry\ SCCC}/t_{dry\ sludge}$ to 20 $kg_{dry\ SCCC}/t_{dry\ sludge}$ (table 2) of the surface-coated calcium carbonate-comprising material (SCCC2) in form of the above described slurry were added to the sludge samples. For example, 0.5 mL of the surface-coated calcium carbonate-comprising mineral material (SCCC2) having a solids content of 10 wt.-% were added to a volume of 50 ml of sludge having a solids content of 10 wt.-%, corresponding to 10 $kg_{dry\ SCCC}/t_{dry\ sludge}$. The samples were agitated for 2 minutes with a magnetic stirrer. After mixing, the sample was filtrated on a paper filter and after 5 minutes the amount of filtrate volume was measured.

TABLE 3

| SCCC2 ($kg_{dry\ SCCC}/t_{dry\ sludge}$) | Dewatering (ml/min) |
|---|---|
| 0 | 3.6 |
| 0.2 | 4.2 |
| 0.5 | 4.3 |
| 1 | 4.2 |
| 2 | 4.2 |
| 5 | 5.3 |
| 10 | 6.2 |
| 20 | 6.6 |

In all samples flocculation could be observed. 3.6 ml clear solvent of the blank sludge sample could be filtrated when no inventive surface-coated calcium carbonate comprising material (SCCC2) was added. By the addition of 0.2 $kg_{dry\ SCCC}/t_{dry\ sludge}$ 4.2 ml clear solvent could be filtrated. This represents an increase of 16%. By the addition of 20 $kg_{dry\ SCCC}/t_{dry\ sludge}$ 6.6 ml clear solvent could be filtrated. This represents an increase of 83%.

This data shows that sludge treatment like polishing sludge is possible with the inventive surface-coated calcium carbonate comprising material. Furthermore, it can be seen that the filtration of the sludge is facilitated by addition of the inventive surface-coated calcium carbonate-comprising material and, therefore, larger quantities can be filtrated in shorter time periods, which leads to a reduction in the treatment time of sludge. A reduced treatment time leads indirectly to decreased treatment costs.

The invention claimed is:

1. A surface-coated calcium carbonate-comprising material comprising at least one surface-reacted calcium carbonate-comprising mineral material and/or a surface-reacted precipitated calcium carbonate, coated with at least one anionic polymer having a negative overall charge density in a range of 1,000 μEq/g (negative charge) to 10,000 μEq/g (negative charge), wherein the surface-reacted calcium carbonate-comprising mineral material is a reaction product obtained by contacting a calcium carbonate-comprising mineral material in an aqueous medium with carbon dioxide and with at least one water soluble acid, wherein the carbon dioxide is formed in situ and/or is supplied from an external source.

2. The surface-coated calcium carbonate-comprising material according to claim 1, wherein the at least one water soluble acid is selected from:
  i) acids having a pKa value of 0 or less at 20° C. (strong acids) or having a pKa value from 0 to 2.5 at 20° C. (medium strong acids): and/or
  ii) acids having a pKa of greater than 2.5 and less than or equal to 7 at 20° C. (weak acids), wherein at least one water soluble salt is additionally provided.

3. The surface-coated calcium carbonate-comprising material according to claim 1, wherein the surface-reacted precipitated calcium carbonate is a reaction product obtained by:

a) providing precipitated calcium carbonate;
b) providing $H_3O^+$ ions;
c) providing at least one anion being capable of forming water insoluble calcium salts, said anion being solubilized in an aqueous medium; and
d) contacting the precipitated calcium carbonate of step a) with said $H_3O^+$ ions of step b) and with said at least one anion of step c) to form a slurry of surface-reacted precipitated calcium carbonate;
wherein an excess of solubilized calcium ions is provided during step d); and
the surface-reacted precipitated calcium carbonate comprises an insoluble and at least partially crystalline calcium salt of said anion formed on the surface of at least part of the precipitated calcium carbonate provided in step a).

4. The surface-coated calcium carbonate-comprising material according to claim 3, wherein:
I) the $H_3O^+$ ions of step b) are provided by addition of a water soluble acid or acidic salt which simultaneously serves to provide all or part of the excess solubilized calcium ions, wherein the water soluble acid or acid salt is selected from the group consisting of sulfur-comprising acids, sulfuric acid, hydrochloric acid, perchloric acid, formic acid, lactic acid, acetic acid, nitric acid, acidic salts thereof, and water soluble calcium acidic salts thereof;
II) the anion of step c) is selected from one or more of the following: phosphate-comprising anions, $PO_4^{3-}$ and $HPO_4^{2-}$, oxalate anions ($C_2O_4^{2-}$), carbonate-comprising anions in the form of $CO_3^{2-}$, phosphonate anions, succinate anions and fluoride anions; and/or
III) the excess of solubilized calcium ions is provided by addition of a water soluble neutral or acidic calcium salt, $CaCl_2$) or $Ca(NO_3)_2$.

5. The surface-coated calcium carbonate-comprising material according to claim 1, wherein:
A) the calcium carbonate-comprising mineral material is selected from the group consisting of marble, chalk, dolomite, limestone, and any mixture thereof; and/or
B) the precipitated calcium carbonate is selected from the group consisting of precipitated calcium carbonates having an aragonitic, vateritic or calcitic crystal form, and mixtures thereof.

6. The surface-coated calcium carbonate comprising material according to claim 1, wherein the at least one surface-reacted calcium carbonate-comprising mineral material and/or surface-reacted precipitated calcium carbonate have a volume median particle diameter $d_{50}$ value before coating of between 0.01 μm and 250 μm, and/or a specific surface area before coating of from 1 to 250 $m^2/g$.

7. The surface-coated calcium carbonate-comprising material according to claim 1, wherein at least 60% of the monomer units of the at least one anionic polymer have an anionic charge.

8. The surface-coated calcium carbonate-comprising material according to claim 1, wherein the at least one anionic polymer is a homopolymer based on monomer units selected from the group consisting of aliphatic unsaturated carboxylic acids having a total amount of 1 to 24 carbon atoms, vinylsulfonic acid, vinylphosphonic acid, esterified acrylates, esterified methacrylates, esterified carbohydrates, acrylic acid and methacrylic acid.

9. The surface-coated calcium carbonate-comprising material according to claim 1, wherein the at least one anionic polymer is a homopolymer based on monomer units of acrylic acid.

10. The surface-coated calcium carbonate-comprising material according to claim 1, wherein the at least one anionic polymer is a copolymer based on monomer units selected from the group consisting of aliphatic unsaturated carboxylic acids having a total amount of 1 to 24 carbon atoms, vinylsulfonic acid, vinylphosphonic acid, esterified acrylates, esterified methacrylates, and esterified carbohydrates, and comonomer units selected from the group consisting of acrylamide, acrylic acid, methacrylic acid, vinylsulfonic acid, vinylpyrrolidone, methacrylamide, N,N-dimethyl acrylamide, styrene, methyl methacrylate, vinyl acetate and mixtures thereof.

11. The surface-coated calcium carbonate-comprising material according to claim 1, wherein the at least one anionic polymer is a copolymer based on monomer units selected from acrylic acid and/or methacrylic acid, and the comonomer units elected from acrylamide and/or diallyldialkyl ammonium salts.

12. The surface-coated calcium carbonate-comprising material according to claim 1, wherein the at least one anionic polymer is a natural homopolymer selected from the group consisting of anionic starch, anionic carboxymethylcellulose, anionic carboxylated cellulose, heparin, anionic dextrane and anionic mannan, or is a natural copolymer based on anionic starch, anionic carboxymethylcellulose, anionic carboxylated cellulose, heparin, anionic dextrane or anionic mannan.

13. The surface-coated calcium carbonate-comprising material according to claim 1, wherein the surface-coated calcium carbonate-comprising material further comprises mineral materials selected from the group consisting of untreated and/or treated ground calcium carbonate (GCC), precipitated calcium carbonate (PCC), surface-reacted calcium carbonate (MCC), kaolin, clay, talc, bentonite, and dolomite.

14. A process for the preparation of the surface-coated calcium carbonate-comprising material according to claim 1, comprising the following steps:
a') providing the at least one surface-reacted calcium carbonate-comprising mineral material and/or the surface-reacted precipitated calcium carbonate,
b') providing the at least one anionic polymer, and
c') contacting the at least one surface-reacted calcium carbonate-comprising mineral material and/or the surface-reacted precipitated calcium carbonate of step a') and the at least one anionic polymer of step b') to obtain the surface-coated calcium carbonate-comprising material.

15. The process according to claim 14, wherein step c') is performed in an aqueous solution.

16. A process for the purification of water and/or dewatering of sludges and/or suspended sediments, comprising the following steps:
A') providing water to be purified and/or sludge and/or suspended sediment to be dewatered comprising impurities;
B') providing at least one surface-coated calcium carbonate-comprising material according to claim 1, and
C') contacting the water and/or sludge and/or suspended sediment of step A') with the at least one surface-coated calcium carbonate-comprising material of step B') to obtain a composite material of surface-coated calcium carbonate-comprising material and impurities.

17. The process according to claim 16, wherein the water and/or sludge and/or suspended sediment of step A') is selected from the group consisting of lake water, river water, water reservoirs, canal water, stream water, brooks water, salty water like brackish water, saline water, brine, estuary water, mining runoff water, mining wash water, sludge, harbour sludge, river sludge, ocean sludge, coastal sludge, suspended sediments, drilling muds, shield wall tunnelling, horizontal directional drilling, micro tunnelling, pipe-jacking, industrial drilling and mining.

18. The process according to claim 16, wherein the water and/or sludge and/or suspended sediment of step A') is brackish water, saline water or brine.

19. The process according to claim 16, wherein the water and/or sludge and/or suspended sediment of step A') is selected from group consisting of drinking water, urban waste water, municipal waste water, industrial waste water, sludge from biogas production or digested sludge, waste water or process water from breweries or beverage industries, waste water or process water in the paper industry, colour-, paints-, or coatings industry, agricultural waste water, slaughterhouse waste water, leather industry waste water and leather tanning industry, process water, waste water, and sludges from on and offshore oil and/or gas industry.

20. The process according to claim 16, wherein the water and/or sludge and/or suspended sediment of step A') is salty water having a conductivity in the range of between 185 µS/cm and 350000 µS/cm.

21. The process according to claim 16, wherein the water and/or sludge and/or suspended sediment of step A') is salty water having a conductivity in the range of between 65000 µS/cm and 80000 µS/cm.

22. The process according to claim 16, wherein the surface-coated calcium carbonate-comprising material is used in a weight ratio of from 1:20000 to 1:30, on a dry weight basis relative to the weight of the dry impurities and/or sludge and/or sediment.

23. A composite material comprising a surface-coated calcium carbonate-comprising material and impurities obtained by the process according to claim 16.

* * * * *